(12) United States Patent
Lee et al.

(10) Patent No.: US 9,716,606 B2
(45) Date of Patent: Jul. 25, 2017

(54) METHOD FOR TRANSMITTING FRAME AND METHOD FOR DETECTING TRANSMISSION MODE

(71) Applicant: NEWRACOM, INC., Irvine, CA (US)

(72) Inventors: Ilgu Lee, Daejeon (KR); Jeongchul Shin, Daejeon (KR); Kyeongpyo Kim, Daejeon (KR); Jongee Oh, Irvine, CA (US); Dae Kyun Lee, Daejeon (KR)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 14/691,307

(22) Filed: Apr. 20, 2015

(65) Prior Publication Data

US 2015/0312907 A1    Oct. 29, 2015

Related U.S. Application Data

(60) Provisional application No. 61/985,413, filed on Apr. 28, 2014.

(30) Foreign Application Priority Data

Aug. 27, 2014  (KR) .......................... 10-2014-0112613
Feb. 9, 2015   (KR) .......................... 10-2015-0019650

(51) Int. Cl.
*H04L 27/20*    (2006.01)
*H04L 5/00*     (2006.01)
*H04L 27/26*    (2006.01)

(52) U.S. Cl.
CPC ........ *H04L 27/2085* (2013.01); *H04L 5/0053* (2013.01); *H04L 27/206* (2013.01); *H04L 27/2613* (2013.01)

(58) Field of Classification Search
CPC ......... H04W 72/0446; H04W 72/0413; H04W 84/12; H04W 28/065; H04L 27/2085; H04L 27/0012; H04L 27/22; H04L 27/2601; H04L 27/2273; H04L 27/3444; H04L 27/261; H04L 27/2607; H04L 27/2602; H04L 27/2613; H04L 5/0048; H04L 5/0007; H04L 5/0044; H04L 5/0023; H04L 5/0092; H04L 5/0053; H04L 1/0025; H04L 1/0618; H04L 69/22; H04L 69/04; H04L 27/206; H04B 7/12; H04B 7/0669; H04B 7/0891; H04B 7/0689
USPC ........ 370/338, 252, 203, 328, 329, 311, 245
See application file for complete search history.

(56) References Cited

U.S. PATENT DOCUMENTS

| | | | |
|---|---|---|---|
| 9,246,729 B2 * | 1/2016 | Zhang | H04L 27/2602 |
| 9,271,241 B2 * | 2/2016 | Kenney | H04W 52/241 |
| 9,397,805 B2 * | 7/2016 | Vermani | H04L 5/0044 |
| 2004/0010746 A1 * | 1/2004 | Lucas | H04L 1/0045 714/781 |
| 2011/0032875 A1 * | 2/2011 | Erceg | H04B 7/0452 370/328 |

(Continued)

*Primary Examiner* — Edan Orgad
*Assistant Examiner* — Ivan O Latorre

(57) ABSTRACT

In a WLAN, a device generates a short training field and a long training field following the short training field. The device generates a first signal field following the long training field, and the first signal field includes a mode field for indicating a transmission mode of a frame to be transmitted and a check bit for protecting at least the mode field. The device transmits the frame including the short training field, the long training field, and the first signal field.

14 Claims, 34 Drawing Sheets

(56) References Cited

U.S. PATENT DOCUMENTS

| | | | | |
|---|---|---|---|---|
| 2011/0110348 | A1* | 5/2011 | Lee | H04L 27/2613 370/338 |
| 2013/0128806 | A1* | 5/2013 | Vermani | H04L 1/0028 370/328 |
| 2014/0307650 | A1* | 10/2014 | Vermani | H04L 5/0044 370/329 |
| 2014/0328249 | A1* | 11/2014 | Vermani | H04W 28/065 370/328 |
| 2015/0023449 | A1* | 1/2015 | Porat | H04L 5/0048 375/295 |
| 2015/0117428 | A1* | 4/2015 | Lee | H04L 27/206 370/338 |
| 2015/0139089 | A1* | 5/2015 | Azizi | H04L 27/2601 370/329 |
| 2015/0146653 | A1* | 5/2015 | Zhang | H04L 5/0041 370/329 |
| 2015/0304078 | A1* | 10/2015 | Cao | H04B 7/12 370/203 |
| 2016/0072654 | A1* | 3/2016 | Choi | H04L 27/2602 370/329 |

* cited by examiner

FIG. 7

| HEW-STF | HEW-LTFs | DATA |

FIG. 8

| HEW-STF | HEW-LTFs | HEW-SIG-B | DATA |

…

METHOD FOR TRANSMITTING FRAME AND METHOD FOR DETECTING TRANSMISSION MODE

CROSS-REFERENCE TO RELATED APPLICATIONS

This application claims priority to and the benefit of U.S. Provisional Application No. 61/985,413, filed on Apr. 28, 2014 in the U.S. Patent and Trademark Office and priority to and the benefit of Korean Patent Application Nos. 10-2014-0112613 and 10-2015-0019650, filed on Aug. 27, 2014 and Feb. 9, 2015 in the Korean Intellectual Property Office, the entire contents of which are incorporated herein by reference.

BACKGROUND (a) Field

The described technology relates generally to a frame transmitting method and a transmission mode detecting method. More particularly, the described technology relates generally to a frame transmitting method and a transmission mode detecting method in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."

After an original standard was published on 1999, new version standards are continuously published by amendments. The IEEE standard 802.11a (IEEE Std 802.11a-1999) supporting 2.4 GHz band was published on 1999, and the IEEE standard 802.11g (IEEE Std 802.11g-2003) supporting 5 GHz band was published on 2003. These standards are called legacy. Subsequently, the IEEE standard 802.11n (IEEE Std 802.11n-2009) for enhancements for higher throughput (HT) was published on 2009, and the IEEE standard 802.11ac (IEEE 802.11ac-2013) for enhancements for very high throughput (VHT) was published on 2013. Recently, a high efficiency WLAN (HEW) for enhancing the system throughput in high density scenarios is being developed by the IEEE 802.11ax task group.

In such WLAN scenarios, because new version devices and previous version devices may coexist, the WLAN is being developed for supporting backward compatibility with the previous version devices.

Therefore, the WLAN device detects a transmission mode of the received frame and interprets the frame when the transmission mode is a supportable mode. The WLAN provides an auto detection scheme for detecting the transmission mode of the frame.

In the IEEE standard 802.11a or 802.11g, a symbol of a legacy signal field (L-SIG), which is subsequent to a legacy short training field (L-STF) and a legacy long training field (L-LTF), is modulated using binary phase shift keying (BPSK) modulation. A data field subsequent to the L-SIG is modulated using various modulation schemes from the BPSK to a 64-quadrature amplitude modulation (64-QAM). An HT-mixed format having a legacy structure of the L-STF, the L-LTF, and the L-SIG is provided in the IEEE standard 802.11n. In the HT-mixed format, an HT signal field (HT-SIG) follows the L-SIG, and the HT-SIG is modulated using quadrature binary phase shift keying (QBPSK) having the different phase from the BPSK. In this case, two symbols of the HT-SIG are modulated using the QBPSK modulation. In the IEEE standard 802.11ac, the legacy structure is maintained and a VHT signal field (VHT-SIG) follows the L-SIG. The first symbol of the VHT-SIG is modulated using the BPSK modulation and the second symbol of the VHT-SIG is modulated using the QBPSK modulation.

A WLAN device can determine that a transmission mode of a frame is a mode according to the IEEE standard 802.11n, particularly the HT-mixed format, when the first symbol following the L-SIG is modulated with the QBPSK modulation. The WLAN device can determine that the transmission mode of the frame is a mode according to the IEEE standard 802.11ac when the first symbol following the L-SIG is modulated using the BPSK modulation and the second symbol is modulated using the QBPSK modulation.

Therefore, it is required to determine a transmission mode according to a new version WLAN when the new version WLAN is developed.

SUMMARY

An embodiment of the present invention provides a frame transmitting method and a transmission mode detecting method for determining a transmission mode in a wireless communication network.

According to another embodiment of the present invention, a method of transmitting a frame by a device in a WLAN is provided. The method includes generating a short training field, generating a long training field following the short training field, generating a first signal field following the long training field, and transmitting the frame including the short training field, the long training field, and the first signal field. The first signal field includes a mode field for indicating a transmission mode of a frame to be transmitted and a check bit for protecting at least the mode field.

The method may further include generating a second signal field being compatible with a previous version WLAN and being positioned between the long training field and the first signal field.

The check bit may protect the second signal field and the mode field.

The first signal field may include a first symbol including the mode field and the check bit.

The first symbol may further include an additional field for carrying signaling information, and the check bit may protect the second signal field, the mode field, and the additional field.

The mode field may be positioned at a beginning of the first symbol, and the check bit may follow the mode field.

The first signal field may further include at least one second symbol following the first symbol. The second symbol includes a check bit for protecting a field of the second symbol.

The first signal field may further include at least one second symbol preceding the first symbol.

The first signal field and the second signal field may be modulated using BPSK modulation.

The previous version WLAN may include a WLAN according to at least one of IEEE standard 802.11a, IEEE standard 802.11g, IEEE standard 802.11ah, or IEEE standard 802.11af.

The frame may further include a training field following the first signal field, the training field being configured to be used for channel estimation, and the first signal field may further include information for indicating whether an additional signal field exists after the training field.

The mode field may include the eighth bit of the first symbol of the first signal field.

The check bit may include at least part of the eighth to sixteenth bits of the first symbol of the first signal field.

According to yet another embodiment of the present invention, a method of transmitting a frame by a device in a WLAN is provided. The method includes modulating a first signal field being compatible with a previous version WLAN using BPSK modulation, modulating a first symbol following the first signal field and a second symbol following the first symbol using the BPSK modulation, modulating a third symbol following the second symbol using QBPSK modulation, and transmitting including the first signal field, the first symbol, the second symbol, and the third symbol.

The first symbol, the second symbol, and the third symbol may correspond to a second signal field carrying information necessary for interpreting the frame.

The first symbol and the second symbol may correspond to a second signal field carrying information necessary for interpreting the frame, and the third symbol may correspond to a short training field configured to be used for automatic gain control.

According to still another embodiment of the present invention, a method of detecting a transmission mode by a device in a WLAN is provided. The method includes receiving a frame including a short training field, a long training field following the short training field, and a first signal field following the long training field, the first signal field including a mode field for indicating a transmission mode and a check bit for protecting at least the mode field, detecting the mode field by decoding the first signal field, and determining the transmission mode of the frame based on the mode field when a check of the check bit passes.

The frame may further include a second signal field being compatible with a previous version WLAN and being positioned between the long training field and the first signal field.

The check bit may protect the second signal field and the mode field.

The first signal field may include a first symbol including the mode field and the check bit, and at least one second symbol following the first symbol. Detecting the mode field may include detecting the mode field by decoding the first symbol.

The first signal field may include a first symbol including the mode field and the check bit, and at least one second symbol preceding the first symbol. Detecting the mode field may include detecting the mode field by decoding the first symbol.

The first signal field and the second signal field may be modulated using BPSK modulation.

The mode field may include the eighth bit of the first symbol of the first signal field.

The check bit may include at least part of the eighth to sixteenth bits of the first symbol of the first signal field.

According to further embodiment of the present invention, a method of detecting a transmission mode by a device in a WLAN is provided. The method includes receiving a frame including a first signal field being compatible with a previous version WLAN, a first symbol following the first signal field, a second symbol following the first symbol, and a third symbol following the second symbol, and determining a transmission mode of the frame based on modulation schemes of the first symbol, the second symbol, and the third symbol.

Determining the transmission mode may include determining the transmission mode of the frame to a transmission mode according to IEEE standard 802.11ax when the first symbol and the second symbol are modulated using BPSK and the third symbol is modulated using QBPSK modulation.

The first symbol, the second symbol, and the third symbol correspond to a second signal field may carry information necessary for interpreting the frame.

The first symbol and the second symbol may correspond to a second signal field carrying information necessary for interpreting the frame, and the third symbol may correspond to a short training field configured to be used for automatic gain control.

According to further embodiment of the present invention, a method of transmitting a frame by a device in a WLAN is provided. The method includes generating a short training field, generating a long training field following the short training field, generating a plurality of symbols following the long training field, the plurality of symbols including a first symbol and a second symbol following the first symbol, and transmitting a frame including the short training field, the long training field, and the plurality of symbols. One of the first symbol and the second symbol is modulated using QBPSK modulation, and the other is modulated using BPSK modulation.

The first symbol may be modulated using the QBPSK modulation, and the second symbol may be modulated using the BPSK modulation.

The first symbol may be modulated using the BPSK modulation, and the second symbol may be modulated using the QBPSK modulation. The plurality of symbols may further include a third symbol following the second symbol and being modulated using the BPSK modulation.

According to further embodiment of the present invention, a method of detecting a transmission mode by a device in a WLAN is provided. The method includes receiving a frame including a short training field, a long training field following the short training field, and a plurality of symbols following the long training field, and determining a transmission mode of the frame based on modulation schemes of the plurality of symbols.

The plurality of symbols may include a first symbol and a second symbol following the first symbol. Determining the transmission mode may include determining the transmission mode of the frame to a transmission mode according to a greenfield format of IEEE standard 802.11ax when the first symbol is modulated using QBPSK and the second symbol is modulated using BPSK modulation.

The plurality of symbols may include a first symbol following the long training field, a second symbol following the first symbol, and a third symbol following the second symbol. Determining the transmission mode may include determining the transmission mode of the frame to a transmission mode according to a greenfield format of IEEE standard 802.11ax when the first symbol is modulated using BPSK, the second symbol is modulated using QBPSK modulation, and the third symbol is modulated using BPSK modulation.

According to further embodiment of the present invention, a method of transmitting a frame by a device in a WLAN is provided. The method includes modulating a first signal field being compatible with a previous version WLAN using BPSK modulation, modulating a first symbol following the first signal field using QBPSK modulation, modulating a second symbol following the first symbol using the BPSK modulation, and transmitting a frame including the first signal field, the first symbol, and the second symbol.

According to further embodiment of the present invention, a method of detecting a transmission mode by a device in a WLAN is provided. The method includes receiving a frame including a first signal field being compatible with a previous version WLAN, a first symbol following the second symbol, and a second symbol following the first symbol, and determining a transmission mode of the frame to a transmission mode according to IEEE standard 802.11ax when the first signal field and the second symbol are modulated using BPSK modulation and the first symbol is modulated using QBPSK modulation.

According to further embodiment of the present invention, a method of transmitting a frame by a device in a WLAN is provided. The method includes generating a short training field, generating a long training field following the short training field, and transmitting a frame including the short training field and the long training field. A sequence of the long training field has orthogonality with a sequence of a long training field of a previous version WLAN.

According to further embodiment of the present invention, a method of detecting a transmission mode by a device in a WLAN is provided. The method includes receiving a frame including a short training field and a long training field following the short training field and detecting a transmission mode of the frame based on a result by an orthogonality function operation between a sequence of the long training field of the received frame and a long training field sequence that is stored.

Detecting the transmission mode includes determining a transmission mode of the frame to a transmission mode according to IEEE standard 802.1lax when the result is greater than or equal to a threshold value.

According to further embodiment of the present invention, a frame transmitting apparatus including a processor and a transceiver is provided in a WLAN. The processor generates a first signal field being compatible with a previous version WLAN, and generates a second signal field following the first signal field and including a mode field for indicating a transmission mode of a frame to be transmitted and a check bit for protecting at least the first signal field and the mode field. The transceiver transmits a frame including the first signal field and the second signal field.

According to further embodiment of the present invention, a frame transmitting apparatus including a processor and a transceiver is provided in a WLAN. The processor modulates a first signal field being compatible with a previous version WLAN using BPSK modulation, modulates a first symbol following the first signal field and a second symbol following the first symbol using the BPSK modulation, and modulates a third symbol following the second symbol using QBPSK modulation. The transceiver transmits a frame including the first signal field, the first symbol, the second symbol, and the third symbol.

According to further embodiment of the present invention, a transmission mode detecting apparatus including a processor and a transceiver is provided in a WLAN. The transceiver receives a frame including a first signal field being compatible with a previous version WLAN and a second signal field following the first signal field. The second signal field includes a mode field for indicating a transmission mode of a frame to be transmitted and a check bit for protecting at least the first signal field and the mode field. The processor determines a transmission mode of the frame based on the mode field when a check of the check bit passes.

According to further embodiment of the present invention, a transmission mode detecting apparatus including a processor and a transceiver is provided in a WLAN. The transceiver receives a frame including a first signal field being compatible with a previous version WLAN, a first symbol following the first signal field, a second symbol following the first symbol, and a third symbol following the second symbol. The processor determines a transmission mode of the frame based on modulation schemes of the first symbol, the second symbol and the third symbol.

BRIEF DESCRIPTION OF THE DRAWINGS

FIG. 7 and FIG. 8 schematically show examples of a HEW compatible part shown in FIG. 4, FIG. 5, and FIG. 6.

DETAILED DESCRIPTION OF THE EMBODIMENTS

Figure 1:
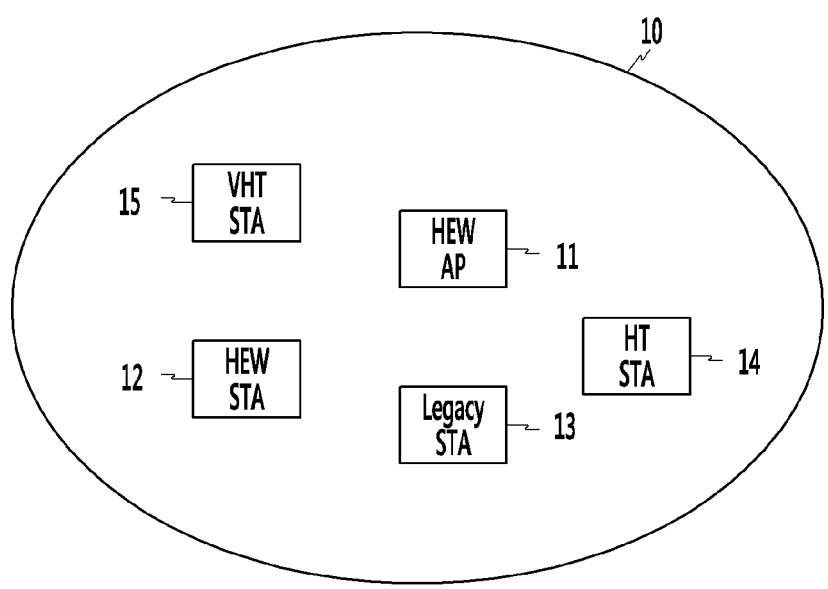
FIG. 1 shows an example of a wireless communication network according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. In the plurality of WLAN devices, at least one WLAN device may be an access point and the other WLAN devices may be non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

Figure 2:
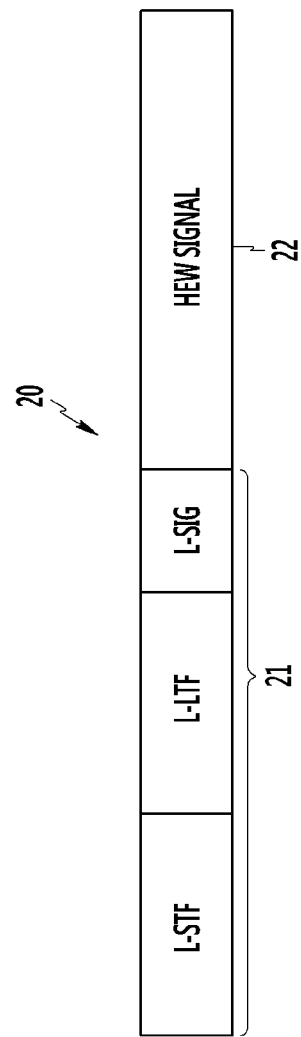
FIG. 2, FIG. 3, FIG. 4, FIG. 5, and FIG. 6 schematically show examples of a frame format of a wireless communication network according to an embodiment of the present invention.
Figure 3:
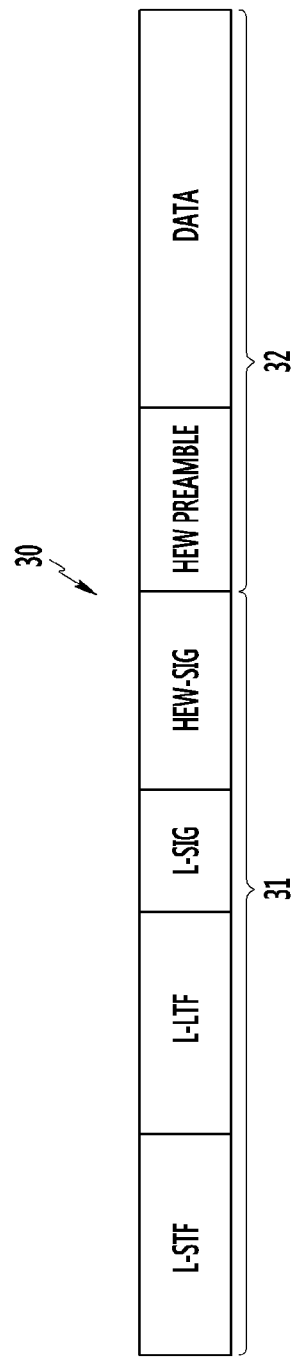

FIG. 1 shows an example of a wireless communication network according to an embodiment of the present invention, and FIG. 2 and FIG. 3 schematically show examples of a frame format of a wireless communication network according to an embodiment of the present invention.

Referring to FIG. 1, a BSS 10 includes a plurality of WLAN devices. In the plurality of WLAN devices, at least one device may be an AP 11, and the other devices may be non-AP STAs, i.e., STAs 12, 13, 14, and 15.

The AP 11 supports a wireless communication network according to an embodiment of the present invention. For example, the wireless communication network according to an embodiment of the present invention may be a new version WLAN. One example of the new version WLAN is a high efficiency WLAN (HEW) that is being developed by the IEEE 802.11ax task group. Hereinafter, the wireless communication network according to an embodiment of the present invention is assumed as the HEW for convenience. The AP supporting the HEW is called a HEW-AP.

The STAs 12, 13, 14, and 15 included in the BSS 10 may include the STA (hereinafter referred to as "HEW-STA") 12 supporting the HEW and/or the STAs 13, 14, and 15 of the previous version. The previous version STAs may include, for example, an STA (hereinafter referred to as a "legacy-STA") 13 supporting IEEE standard 802.11a or 802.11g (IEEE Std 802.11a-1999 or IEEE Std 802.11g-2003), an STA (hereinafter referred to as an "HT-STA") 14 supporting IEEE standard 802.11n (IEEE Std 802.11n-2009) for enhancements for higher throughput (HT), or an STA (hereinafter referred to as a "VHT-STA") 15 supporting IEEE standard 802.11ac (IEEE Std 802.11ac-2013) for enhancements for very high throughput (VHT).

In the BSS 10, the HEW-AP 11 may transmit to the HEW-STA 12 a frame of a transmission mode (hereinafter referred to as a "HEW mode") according to IEEE standard 802.11ax. The HEW-AP 11 may transmit to the previous version STA 13, 14, or 15) a previous version frame, for example a frame of a transmission mode (hereinafter referred to as a "legacy mode") according to the IEEE standard 802.11a or IEEE 802.11g, a frame of a transmission mode (hereinafter referred to as an "HT mode") according to the IEEE standard 802.11n, or a frame of a transmission mode (hereinafter referred to as a "VHT mode") according to the IEEE standard 802.11ac. The HEW-STA 12 may transmit a frame of the HEW mode to the HEW-AP 11. The previous version STA 13, 14, or 15 may transmit to the HEW-AP 11 a previous version frame, for example a frame of the legacy mode, the HT mode, or the VHT mode.

Hereinafter, an AP or STA supporting the HEW is called a "HEW device", an AP or STA supporting the IEEE standard 802.11a or IEEE 802.11g is called a "legacy device", an AP or STA supporting IEEE standard 802.11n is called an "HT device", and an AP or STA supporting IEEE standard 802.11ac is called a "VHT device".

In some embodiments, when a different band from 2.4 GHz or 5 GHz band in the WLAN, other WLAN standards may be used as the previous version WLAN. For example, when a TV white space band is used, IEEE standard 802.11af may be used as the previous version WLAN. When 1 GHz or less band is used, IEEE standard 802.11ah may be used as the previous version WLAN.

Referring to FIG. 2, a frame 20 according to an embodiment of the present invention includes a legacy signal part 21 and a signal part 22 for a wireless communication network according to the present embodiment, for example a HEW signal part 22. The frame 20 shown in FIG. 2 and frames to be described below may be physical layer (PHY) frames, for example a physical layer convergence procedure (PLCP) frames.

The legacy signal part 21 includes a legacy short training field (L-STF), a legacy long training field (L-LTF), and a legacy signal field (L-SIG) for backward compatibility with previous version WLAN devices. The L-STF and the L-LTF may be used for carrier sensing, gain control, synchronization, and channel estimation. The L-SIG may include rate and length information. The L-SIG includes one symbol, i.e., an orthogonal frequency division multiplexing (OFDM) symbol.

The HEW signal part 22 carries signaling information for a HEW device. The signaling information includes information necessary for interpreting the frame 20. The HEW signal part 22 includes a HEW signal field (HEW-SIG) following the legacy signal part 21. The HEW-SIG includes information a transmission mode corresponding to a frame format.

The signaling information of the L-SIG and the HEW-SIG can be decoded based on the channel information estimated by the L-STF and the L-LTF. It can be detected whether the transmission mode of the frame 20 is a HEW mode based on the information decoded in the HEW-SIG.

Referring to FIG. 3, a frame 30 according to an embodiment of the present invention includes a legacy compatible part 31 and a part supporting a wireless communication network according to an embodiment of the present invention, for example a HEW compatible part 32.

The legacy compatible part 31 includes a legacy short training field (L-STF), a legacy long training field (L-LTF), a legacy signal field (L-SIG) and a HEW signal field (HEW-SIG) described with reference to FIG. 2. Signaling information of the HEW-SIG can be decoded by channel information estimated by the L-LTF, and the signaling information includes information necessary for interpreting the frame 30, particularly the HEW compatible part 32.

The HEW compatible part 32 includes a HEW preamble and a data field, and may further include an additional HEW signal field. The HEW preamble is a training field to be used for channel estimation. Signaling information of the additional HEW signal field can be decoded based on the channel information estimated by the HEW preamble.

Figure 4:
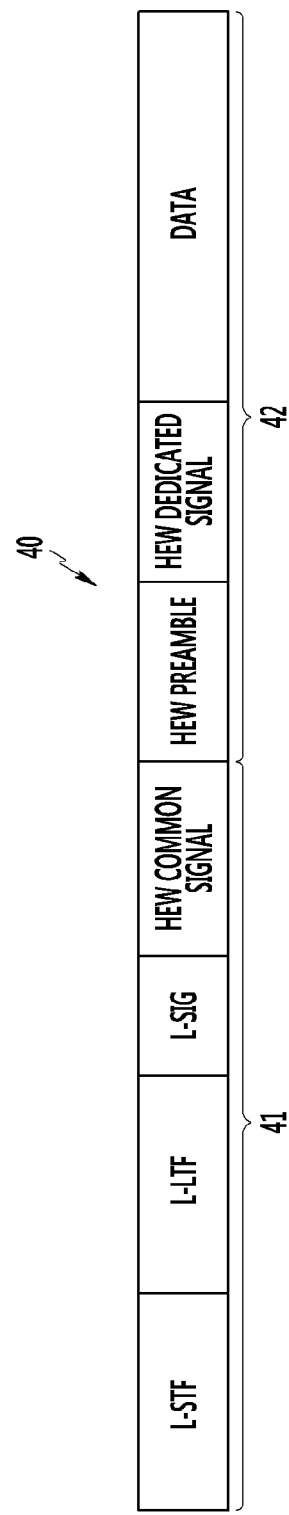
Figure 5:
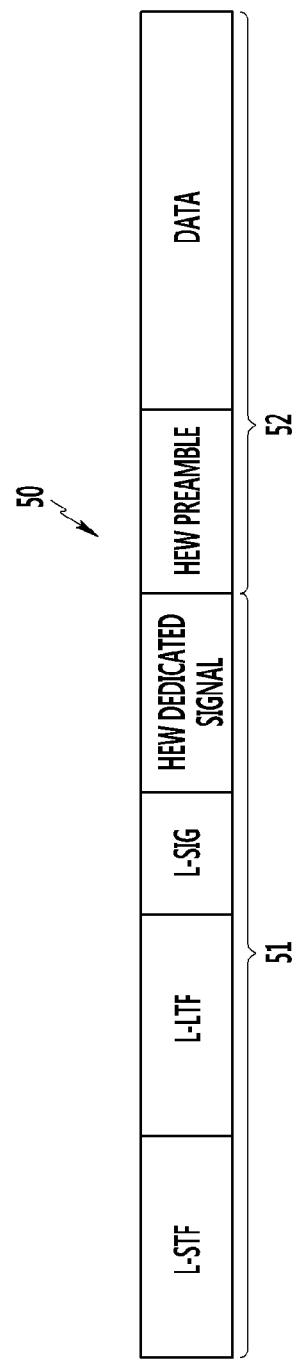
Figure 6:
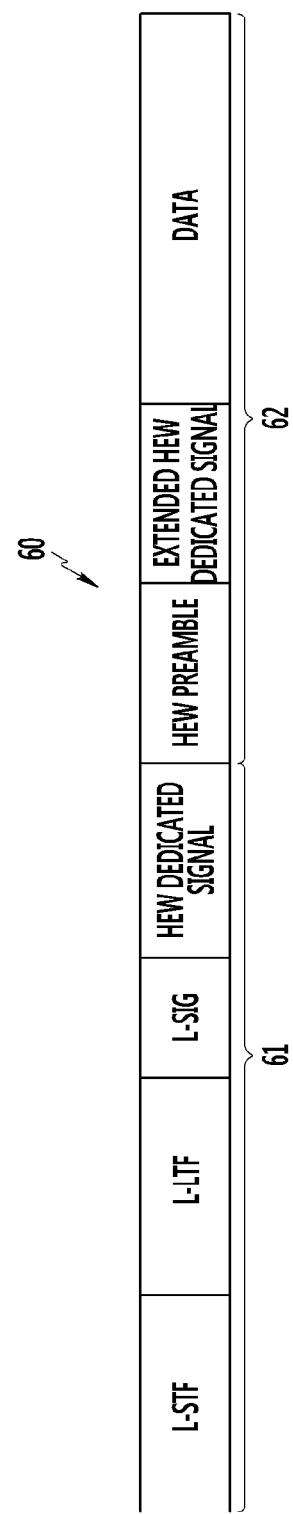

FIG. 4, FIG. 5, and FIG. 6 schematically show various examples of a frame format of a wireless communication network according to an embodiment of the present invention, and FIG. 7 and FIG. 8 schematically show examples of a HEW compatible part shown in FIG. 4, FIG. 5, and FIG. 6.

Referring to FIG. 4, a frame 40 according to an embodiment of the present invention includes a legacy compatible part 41 and a HEW compatible part 42.

The legacy compatible part 41 includes a legacy short training field (L-STF), a legacy long training field (L-LTF), a legacy signal field (L-SIG), and a HEW common signal field. The HEW compatible part 42 includes a HEW preamble, a HEW dedicated signal field, and a data field. The HEW common signal field may include HEW signaling information that is common within a BSS. The HEW dedicated signal field may include HEW signaling information that is dedicated to a user when a multi-user multiple-input and multiple output (MU-MIMO) is used.

Referring to FIG. 5, a frame 50 according to another embodiment of the present invention includes a legacy compatible part 51 and a HEW compatible part 52.

The legacy compatible part 51 includes a legacy short training field (L-STF), a legacy long training field (L-LTF), a legacy signal field (L-SIG), and a HEW dedicated signal field. The HEW compatible part 52 includes a HEW preamble and a data field. The HEW dedicated signal field may include HEW signaling information that is common within a BSS and HEW signaling information that is dedicated to a user.

Referring to FIG. 6, a frame 60 according to yet another embodiment of the present invention includes a legacy compatible part 61 and a HEW compatible part 62.

The legacy compatible part 61 includes a legacy short training field (L-STF), a legacy long training field (L-LTF), a legacy signal field (L-SIG), and a HEW dedicated signal field. The HEW compatible part 62 includes a HEW preamble, an extended HEW dedicated signal field, and a data field. The HEW dedicated signal field may include HEW signaling information that is common within a BSS and HEW signaling information that is dedicated to a user. The extended HEW dedicated signal field may include information that cannot be carried due to the restriction of the number of symbols included in the HEW dedicated signal field.

In some embodiments, the frame formats shown in FIG. 5 and FIG. 6 may be used together. In this case, the HEW dedicated signal field of a short preamble frame 50 or 60 may further include indication indicating whether the short preamble frame includes the extended HEW dedicated signal field. If the indication indicates that the extended HEW dedicated signal field is included, the short preamble frame 60 has the HEW dedicated signal field as shown in FIG. 6. If the indication indicates that the extended HEW dedicated signal field is not included, the short preamble frame 50 does not have the extended HEW dedicated signal field as shown in FIG. 5.

In some embodiments, the frame formats shown in FIG. 4, FIG. 5, and FIG. 6 may be used together. That is, a HEW device may select any one from among a long preamble frame 40 shown in FIG. 4, a short preamble frame 50 shown in FIG. 5, or an extended short preamble frame 60 shown in FIG. 6.

In one embodiment, a HEW common signal field of the long preamble frame 40 and HEW dedicated signal fields of the short preamble frames 50 and 60 may include format information indicating any one of the long preamble frame, the short preamble frame, or the extended short preamble frame. In another embodiment, the HEW common signal field of the long preamble frame 40 and the HEW dedicated signal fields of the short preamble frames 50 and 60 may include format information indicating any one of the long preamble frame or the short preamble frame. In this case, the HEW dedicated signal fields of the short preamble frames 50 and 60 may further include indication information indicating whether the extended HEW dedicated signal field is included.

Referring to FIG. 7 and FIG. 8, a HEW preamble of a HEW compatible part 42, 52, or 62 may include a HEW short training field (HEW-STF) and a HEW long training field (HEW-LTF). The HEW-STF may include one symbol, and the HEW-LTF may include a plurality of long preambles (HEW-LTFs). The HEW-STF may be used for automatic gain control of the HEW compatible part 42, 52, or 62. The HEW-LTFs may be used for channel estimation of the HEW compatible part 42, 52, or 62.

When the HEW compatible part 42 or 62 includes an additional HEW signal field (HEW-SIG-B) that is the HEW dedicated signal field shown in FIG. 4 or the extended HEW dedicated signal field shown in FIG. 6, the HEW-SIG-B may follow the HEW-LTFs as shown in FIG. 8.

Hereinafter, a transmission mode detecting method according to various embodiments of the present invention is described with reference to FIG. 9 to FIG. 30.

Figure 9:
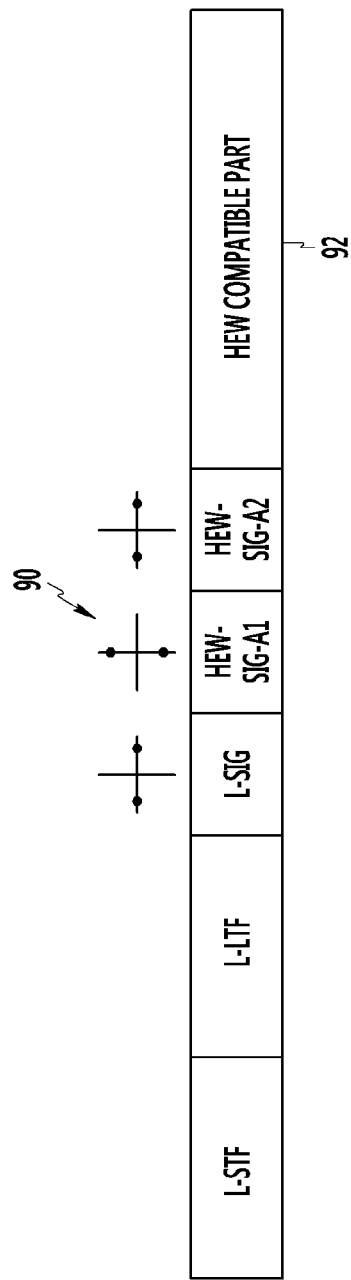
FIG. 9 schematically shows an example of a frame format for transmission mode detection in a wireless communication network according to an embodiment of the present invention.

FIG. 9 schematically shows an example of a frame format for transmission mode detection in a wireless communication network according to an embodiment of the present invention.

Referring to FIG. 9, a frame 90 includes a legacy short training field (L-STF), a legacy long training field (L-LTF), a legacy signal field (L-SIG), and a HEW signal field. The HEW signal field includes at least two symbols (HEW-SIG-A1 and HEW-SIG-A2). The frame 90 may further include a HEW compatible part 92 following the HEW signal field.

The L-SIG is modulated using the BPSK modulation, the first symbol (HEW-SIG-A1) of the HEW signal field is modulated using the QBPSK modulation, the second symbol (HEW-SIG-A2) of the HEW signal field is modulated using the BPSK modulation.

A HEW device receiving the frame 90 can determine that a transmission mode of the frame 90 is a HEW mode when the first symbol following the L-SIG is modulated with the QBPSK (i.e., has a QBPSK phase) and the second symbol following the L-SIG is modulated with the BPSK (i.e., has a BPSK phase).

When the transmission mode of a frame is an HT mode, particularly an HT mixed format, two symbols following the L-SIG correspond to an HT signal field and are modulated using the QBPSK modulation. When the transmission mode of a frame 90 is a VHT mode, two symbols following the L-SIG correspond to the VHT signal field. The first symbol of the two symbols is modulated using the BPSK modulation, and the second symbol of the two symbols is modulated using the QBPSK modulation.

However, in the previous version WLAN, the HT device may determine that the transmission mode of the frame is the HT mode without checking the second symbol when the first symbol is modulated with the QBPSK. Therefore, when the frame format shown in FIG. 9 is used, the HT device may misdetermine that a frame of the HEW mode is the HT mode and interpret the HEW signal field as the HT signal field thereby misoperating.

Figure 10:
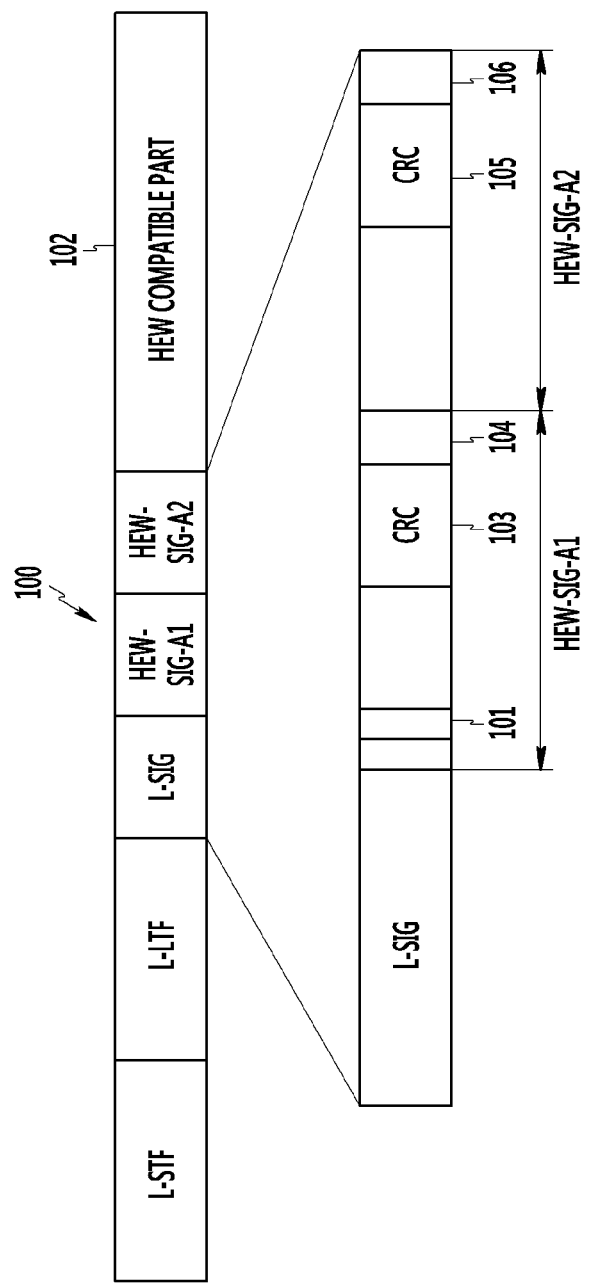
FIG. 10, FIG. 11, FIG. 13, FIG. 14, FIG. 15, and FIG. 17 schematically show examples of a frame format for transmission mode detection in a wireless communication network according to various embodiments of the present invention.
Figure 11:
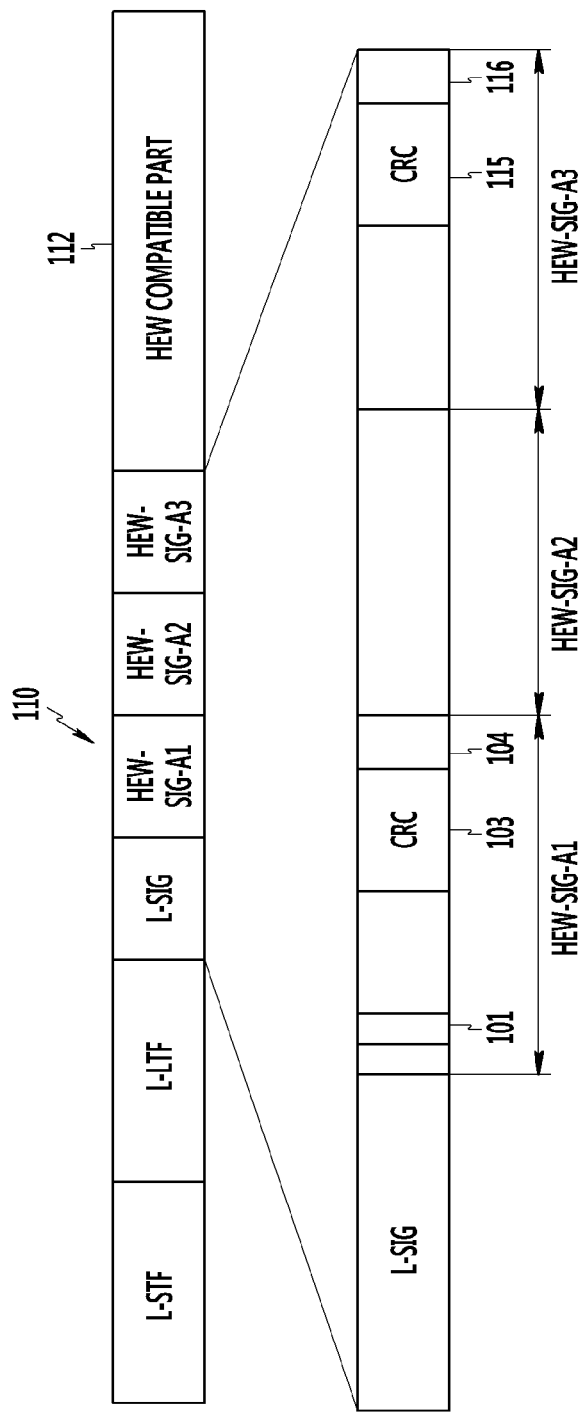
Figure 12:
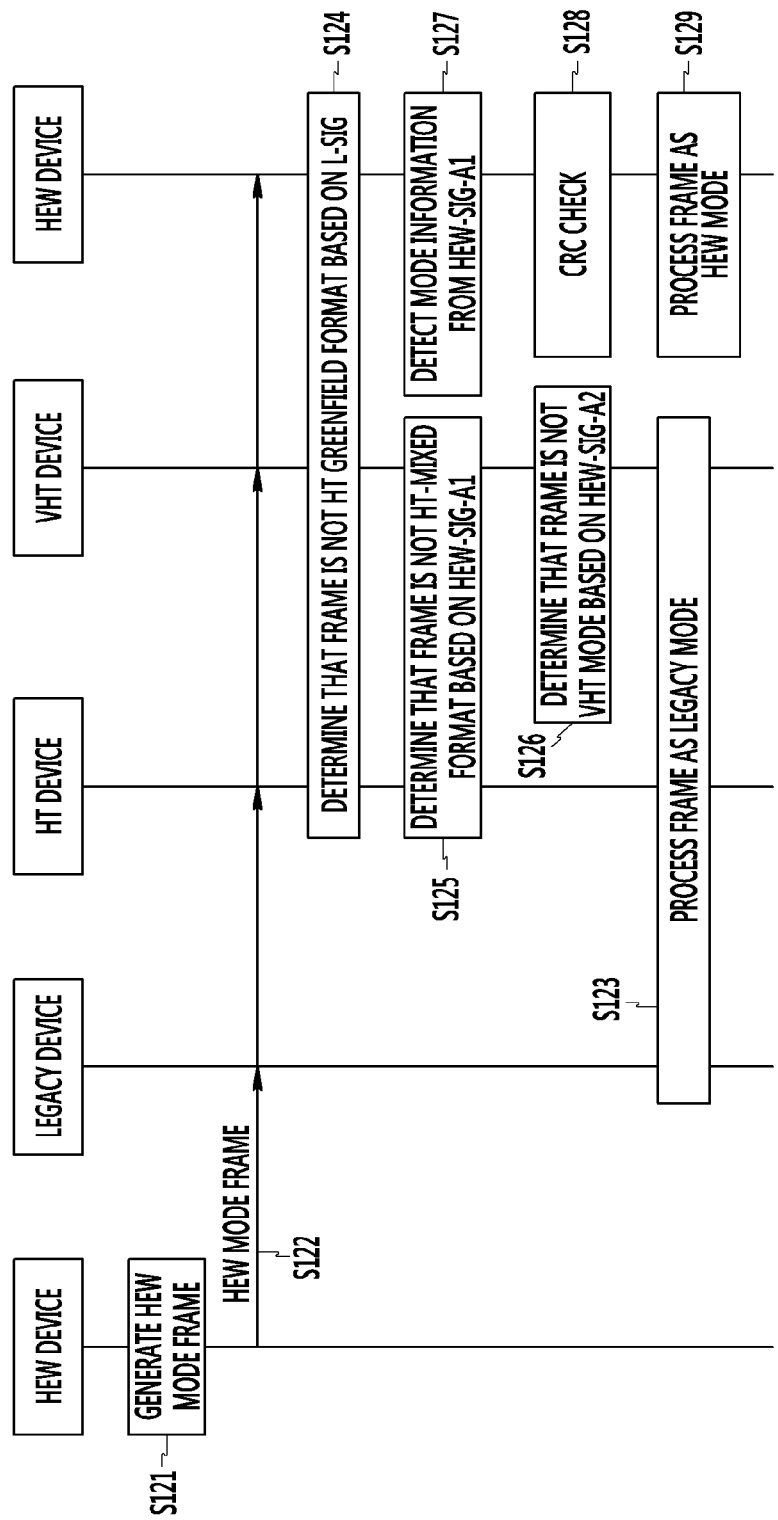
FIG. 12 is a flowchart exemplifying a transmission mode detecting method using a frame format shown in FIG. 10 or FIG. 11.

FIG. 10 and FIG. 11 schematically show examples of a frame format for transmission mode detection in a wireless communication network according to another embodiment of the present invention, and FIG. 12 is a flowchart exemplifying a transmission mode detecting method using a frame format shown in FIG. 10 or FIG. 11.

Referring to FIG. 10, a frame 100 includes a legacy short training field (L-STF), a legacy long training field (L-LTF), a legacy signal field (L-SIG), and a HEW signal field, and the HEW signal field includes at least two symbols (HEW-SIG-A1 and HEW-SIG-A2). The frame 100 may further include a HEW compatible part 102 following the HEW signal field (HEW-SIG-A1 and HEW-SIG-A2). The L-SIG and the HEW-SIG-A1 and HEW-SIG-A2 of the HEW signal field may be modulated using the BPSK modulation.

One symbol of the HEW signal field, for example the first symbol (HEW-SIG-A1) includes a mode field 101 including mode information for indicating a transmission mode of the frame 100. In another embodiment, the other symbol, for example the second symbol (HEW-SIG-A2) may include the mode field 101 instead of the HEW-SIG-A1 in the HEW signal field.

In some embodiments, the HEW-SIG-A1 includes a cyclic redundancy check (CRC) 103 protecting the L-SIG and a part or the whole of fields of the HEW-SIG-A1. The part of the fields includes the mode field 101. In one embodiment, when the CRC 103 protects the part including the mode field 101 of the HEW-SIG-A1 the CRC may follow the mode field 101.

The CRC 103 is calculated over the L-SIG and the part or the whole of the fields of the HEW-SIG-A1. Accordingly, the HEW device can detect the mode information from the HEW-SIG-A1 and determine the transmission mode of the frame if the CRC check passes. Since the CRC 103 of the HEW-SIG-A1 protects the L-SIG as well as the mode field 101 of the HEW-SIG-A1, reliabilities of the mode information included in the HEW-SIG-A1, other signaling information included in the HEW-SIG-A1, and rate and length information included in the L-SIG can be guaranteed. Additionally, error detection reliability of the L-SIG can be enhanced compared with a conventional scheme for detecting an error of the L-SIG by 1 bit parity check.

In another embodiment, the CRC 103 may protect a part or the whole of fields of the HEW-SIG-A1 without protecting the L-SIG. The CRC 103 may be calculated only over the part or the whole of fields of the HEW-SIG-A1.

In yet another embodiment, the HEW-SIG-A1 may further include a signal tail 104 at an end of the symbol. Bits of the signal tail 104 may be set to '0'.

In still another embodiment, the second symbol (HEW-SIG-A2) of the HEW signal field may include a CRC 105 and a signal tail 106. The CRC 105 may be calculated over a field of the HEW-SIG-A2. Accordingly, the CRC 105 can protect the HEW-SIG-A2.

For example, assuming that the HEW signal field is modulated using the BPSK modulation and is coded with a coding rate of ½, one symbol of the HEW signal field has 24 bits. Each HEW signal symbol may include signaling information of 10 bits, the CRC of 8 bits, and the signal tail of 6 bits. Then, the HEW signal field can carry the signaling information of 20 bits. Therefore, the signaling information may further include HEW signaling information, for example resource allocation information, MU-MIMO information, OFDMA information, and/or power saving information besides.

When 20 or more bits are required for the signaling information, the HEW signal field may include 3 or more symbols. As shown in FIG. 11, a HEW signal field of a frame 110 includes three symbols (HEW-SIG-A1, HEW-SIG-A2, and HEW-SIG-A3), the third symbol (HEW-SIG-A3) may include a CRC 115 that is calculated over fields of the second and third symbols (HEW-SIG-A2 and HEW-SIG-A3) and a signal tail 116. Therefore, the CRC 115 can protect the second and third symbols (HEW-SIG-A2 and HEW-SIG-A3). In this case, total 44 bits including 10 bits of the HEW-SIG-A1, 24 bits of the HEW-SIG-A2, and 10 bits of the HEW-SIG-A3 can be used for carrying the signaling information.

In one embodiment, a HEW device receiving a frame may decode the HEW signal field using two decoders. In this case, while one decoder detects a mode field with decoding the HEW-SIG-A1 of the HEW signal field, the other decoder can decode the HEW-SIG-A2 at the same time.

In another embodiment, a HEW device receiving a frame may decode the HEW signal field using one decoder. In this case, after detecting the mode field stored in a deinterleaver with decoding the HEW-SIG-A1, if the CRC check passes, the decoder decodes the HEW-SIG-A1 again and then decodes the HEW-SIG-A2. If the CRC check fails, the decoder decodes a next symbol (HEW-SIG-A2). A Viterbi decoder may be used as such decode.

Next, examples of the mode field 101 are described with reference to Table 1 to Table 4.

As exemplified in Table 1, the mode field may have 1 bit. One value (for example, '0') of the mode field may indicate a previous version mode (i.e., a legacy mode, an HT mode, or a VHT mode), and the other value (for example, '1') may indicate a HEW mode.

TABLE 1

| Value | Mode |
| --- | --- |
| 0 | Legacy/HT/VHT |
| 1 | HEW |

As exemplified in Table 2 and Table 3, the mode field may have 2 bits. Similar to Table 1, one value (for example, '00') of the mode field may indicate the previous version mode, and another value (for example, '01') may indicate the HEW mode. The other values (for example, '10' and '11') may be reserved. Alternatively, four values of 2 bits may indicate the legacy mode, the HT mode, the VHT mode, and the HEW mode, respectively. For example, '00', '01', '10', and '11' may indicate the legacy mode, the HT mode, the VHT mode, and the HEW mode, respectively.

TABLE 2

| Value | Mode |
| --- | --- |
| 00 | Legacy/HT/VHT |
| 01 | HEW |
| 10 | Reserved |
| 11 | Reserved |

TABLE 3

| Value | Mode |
| --- | --- |
| 00 | Legacy |
| 01 | HT |
| 10 | VHT |
| 11 | HEW |

As exemplified in Table 4, the mode field 3 or more bits. Similar to Table 3, four values (for example, '000', '001', '010', and '011') of 3 bits may indicate the legacy mode, the HT mode, the VHT mode, and the HEW mode, respectively. Other values (for example, '100' to '111') may be reserved.

TABLE 4

| Value | Mode |
|---|---|
| 000 | Legacy |
| 001 | HT |
| 010 | VHT |
| 011 | HEW |
| 100-111 | Reserved |

Next, a transmission mode detecting method using a frame format shown in FIG. 10 or FIG. 11 is described with reference to FIG. 12.

Referring to FIG. 12, a transmitting (Tx) HEW device sets a mode field to a HEW mode and generates a frame of the HEW mode (S121). The Tx HEW device transmits the generated frame (S122). In this case, a HEW device, a legacy device, an HT device, or a VHT device may receive the frame.

The legacy device deems the received frame a legacy mode (S123) and decodes the L-SIG to spoof the frame as the legacy frame.

The HT device, the VHT device, or the HEW device determines that the received frame is not an HT-greenfield format since the L-SIG has been modulated using BPSK modulation (S124). Subsequently, the HT device or the VHT device determines that the received frame is not an HT-mixed format since the first symbol (HEW-SIG-A1) has been modulated using the BPSK modulation (S125). Accordingly, the HT device processes the received frame as the legacy mode (S123). The VHT device determines that the received frame is not a VHT mode since the second symbol (HEW-SIG-A2) has been modulated using the BPSK modulation (S126), and processes the received frame as the legacy mode (S123).

The HEW device detects mode information from a mode field (101 of FIG. 10 or FIG. 11) of the HEW-SIG-A1 modulated using the BPSK modulation (S127), and checks a CRC of the HEW-SIG-A1 (S128). If the CRC check passes, the HEW device determines that the received frame is the HEW mode based on the mode information and processes the received frame as the HEW mode (S129).

Figure 13:
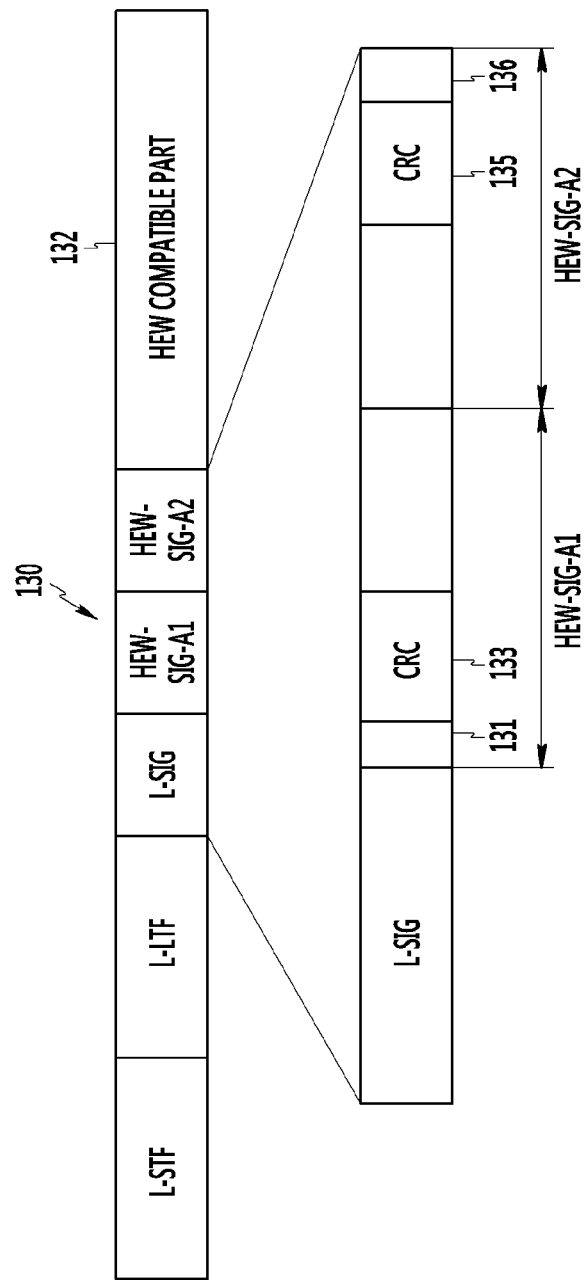
Figure 14:
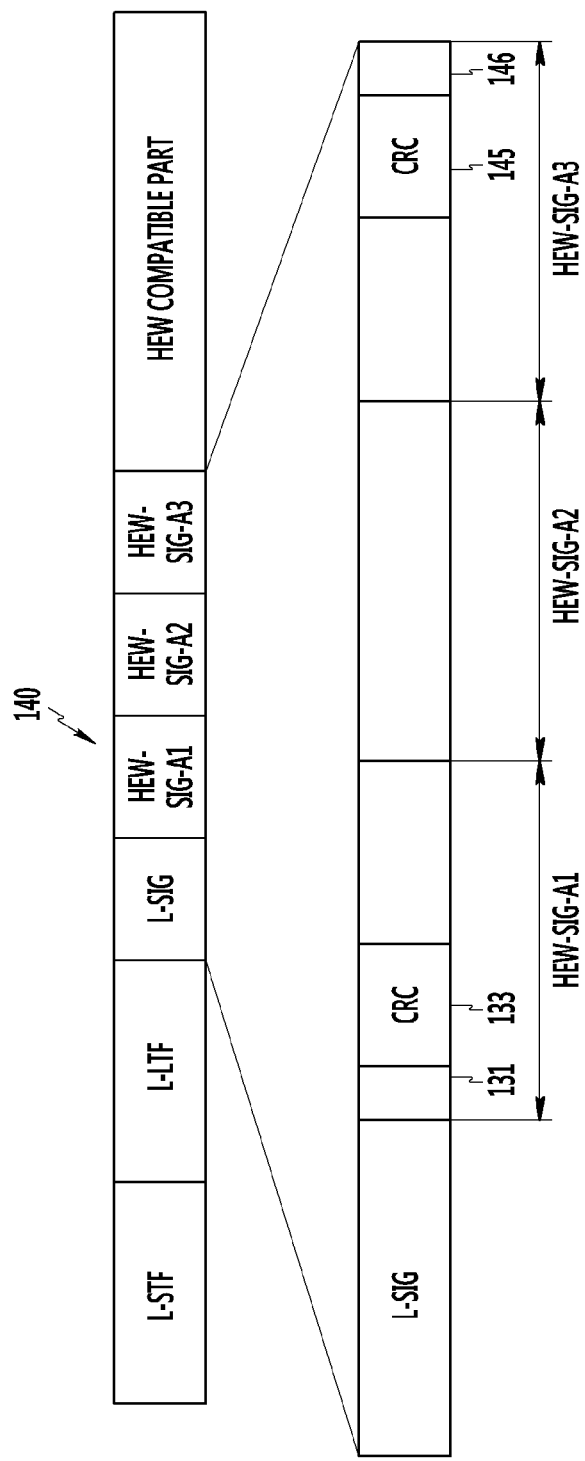

FIG. 13 and FIG. 14 schematically show examples of a frame format for transmission mode detection in a wireless communication network according to another embodiment of the present invention.

Referring to FIG. 13, a frame 130 includes a legacy short training field (L-STF), a legacy long training field (L-LTF), a legacy signal field (L-SIG), and a HEW signal field. The HEW signal field includes at least two symbols (HEW-SIG-A1 and HEW-SIG-A2). The frame 130 may further include a HEW compatible part 132 following the HEW signal field. The L-SIG and the HEW-SIG-A1 and HEW-SIG-A2 of the HEW signal field may be modulated with the BPSK.

The first symbol (HEW-SIG-A1) of the HEW signal field a mode field 131 including mode information for indicating a transmission mode of the frame 130 and a CRC 133 following the mode field 131. In some embodiments, the CRC 131 may directly follow the mode field 101 without the intervening field.

The CRC 133 may be calculated over the L-SIG and the mode field 131 of the HEW-SIG-A1, or may be calculated over the L-SIG and the HEW-SIG-A1. In some embodiments, the mode field 131 may be positioned at a beginning of the HEW-SIG-A1.

The second symbol (HEW-SIG-A2) of the HEW signal field may include a CRC 135 and a signal tail 136. The CRC 135 may be calculated over remaining field except the mode field 131 of the HEW-SIG-A1 and a field of the HEW-SIG-A2, or may be calculated over only the field of the HEW-SIG-A2. Alternatively, the CRC 135 may be calculated over fields of both the HEW-SIG-A1 and the HEW-SIG-A2.

In some embodiments, a transmitter transmitting the frame 130 may preprocess the HEW-SIG-A1 to allow the mode field 131 and the CRC 133 to be first outputted when a decoder of a receiver receiving the frame 130 bit-reverses the HEW-SIG-A1. Then, after the receiver detects the mode information from the mode field 131, the receiver can determine the transmission mode of the frame 130 if the CRC check of the CRC 133 passes. Since the receiver can process the mode field 131 and the CRC 133 first, the receiver can determine the transmission mode quickly.

In the case that 20 or more bits are required for the signaling information, the HEW signal field may include three or more symbols. As shown in FIG. 14, when a HEW signal field of a frame 140 includes three symbols (HEW-SIG-A1, HEW-SIG-A2, and HEW-SIG-A3), the third symbol (HEW-SIG-A3) may include a CRC 145 calculated over the remaining field of the first symbol (HEW-SIG-A1) and fields of the second and third symbols (HEW-SIG-A2 and HEW-SIG-A3), and a signal tail 146. Accordingly, the CRC 145 can protect the remaining field except the mode field 131 of the HEW-SIG-A1, and the HEW-SIG-A2 and HEW-SIG-A3. In this case, total 44 bits including 10 bits of the HEW-SIG-A1 24 bits of the HEW-SIG-A2, and 10 bits of the HEW-SIG-A3 can carry the signaling information.

Further, in the case that the frame format shown in FIG. 13 or FIG. 14 is used, the transmission mode can be detected as described with reference to FIG. 2.

As described above, the transmission mode of the HEW mode frame can be detected from the mode field of the HEW signal field. Further, since the mode field and the L-SIG can be protected by the CRC, reliabilities of the mode information and rate and length information included in the L-SIG can be guaranteed.

While it has been described in above embodiments that a CRC is used as an example of a check bit for protecting a field, other check bits may be used for protecting the field. In some embodiments, a parity check bit may be used as another example of the check bit. In one embodiment, the parity check bit can improve error detecting performance by being used together with a bit (for example, a parity bit or a reserved bit) for the parity check included in the L-SIG.

Next, embodiments for detecting a transmission mode of a frame by using a phase difference are described with reference to FIG. 15 to FIG. 21.

Figure 15:
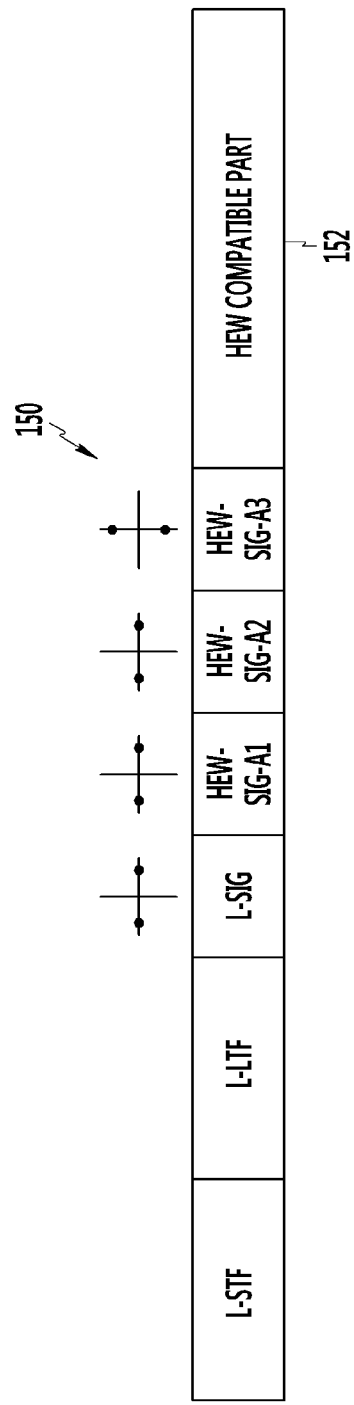
Figure 16:
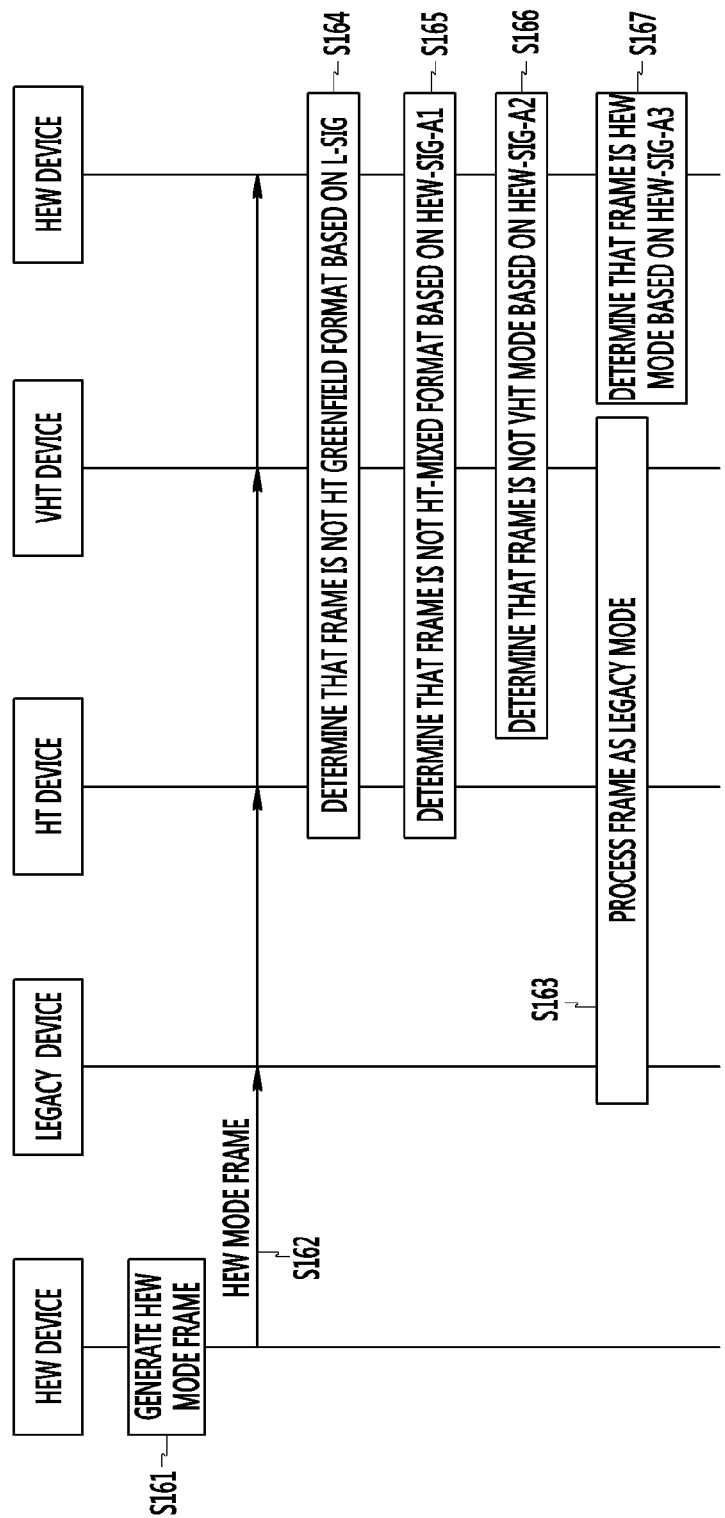
FIG. 16 is a flowchart exemplifying a transmission mode detecting method using a frame format shown in FIG. 15 or FIG. 17.
Figure 17:
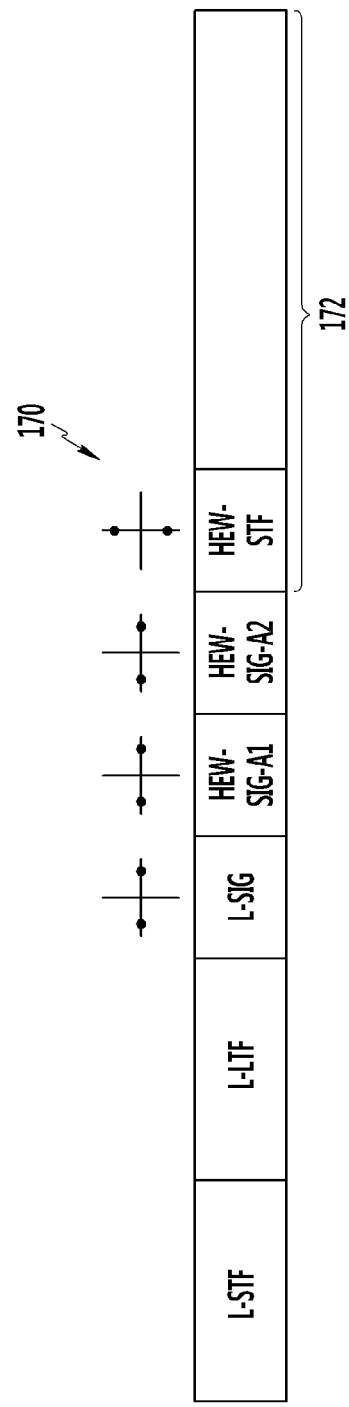

FIG. 15 and FIG. 17 schematically show examples of a frame format for transmission mode detection in a wireless communication network according to another embodiment of the present invention, and FIG. 16 is a flowchart exemplifying a transmission mode detecting method using a frame format shown in FIG. 15 or FIG. 17.

Referring to FIG. 15, a frame 150 includes a legacy short training field (L-STF), a legacy long training field (L-LTF), a legacy signal field (L-SIG), and three symbols following the L-SIG. The three symbols are three symbols (HEW-SIG-A1, HEW-SIG-A2, and HEW-SIG-A3) of a HEW signal field. The frame 150 may further include a HEW compatible part 152 following the HEW signal field.

The L-SIG and the first and second HEW signal symbols (HEW-SIG-A1 and HEW-SIG-A2) are modulated using the BPSK modulation, and the third HEW signal symbols (HEW-SIG-A3) is modulated using the QBPSK modulation. The QBPSK is phase-rotated by 90° relative to the BPSK.

Referring to FIG. 16, a Tx HEW device generates the frame 150 of a HEW mode as shown in FIG. 15 (S161), and transmits the generated frame 150 (S162). In this case, a HEW device, a legacy device, an HT device, or a VHT device may receive the frame 150.

The legacy device deems the received frame 150 a legacy mode (S163) and decodes the L-SIG to spoof the frame as the legacy frame. The HT device, the VHT device, or the HEW device determines that the received frame 150 is not an HT-greenfield format since the L-SIG has been modulated using BPSK modulation (S164), and determines that the received frame is not an HT-mixed format since the first symbol (HEW-SIG-A1) has been modulated using the BPSK modulation (S165). Accordingly, the HT device processes the received frame as the legacy mode (S163). The VHT device determines that the received frame is not a VHT mode since the second symbol (HEW-SIG-A2) has been modulated using the BPSK modulation (S166). Accordingly, the VHT device processes the received frame as the legacy mode (S163). The HEW device determines that the received frame is the HEW mode since the third symbol (HEW-SIG-A3) has been modulated using the QBPSK modulation, and processes the received frame as the HEW mode (S167).

As described above, the HEW device can automatically detect the transmission mode of the frame based on modulation schemes, i.e., phases of the symbols following the L-SIG, and then can decode the HEW signal field to use the decoded information for decoding a data field of the HEW compatible part.

Referring to FIG. 17, three symbols following a legacy signal field (L-SIG) in a frame 170 includes two symbols (HEW-SIG-A1 and HEW-SIG-A2) of the HEW signal field and a preamble for a HEW compatible part 172. In some embodiments, the preamble for the HEW compatible part 172 may be a HEW short training field (HEW-STF).

The L-SIG and the first and second HEW signal symbols (HEW-SIG-A1 and HEW-SIG-A2) are modulated using the BPSK modulation, and the third symbol, for example the HEW-STF is modulated using the QBPSK modulation. Accordingly, as described with reference to FIG. 16, the HEW device can determine whether the frame 170 is the HEW mode based on the third symbol (HEW-STF).

As such, when the preamble (for example, the HEW-STF) of the HEW compatible part is used as the third symbol, the number of symbols in the HEW signal field can be decreased compared with an embodiment described with reference to FIG. 15 such that overhead of the HEW signal field can be reduced. Further, when the preamble of the HEW compatible part is phase-rotated by 90° relative to the BPSK, a Euclidean distance between the preamble and a data field that is modulated using the BPSK modulation in the legacy mode frame can be maximized such that reliability of preamble detection can be enhanced.

Furthermore, when the HEW-STF is used as the third symbol, the HEW device can perform an automatic gain control of the HEW compatible part using the HEW-STF simultaneously with detecting the transmission mode. Hereinafter, such embodiments are described with reference to FIG. 18 to FIG. 21.

Figure 18:
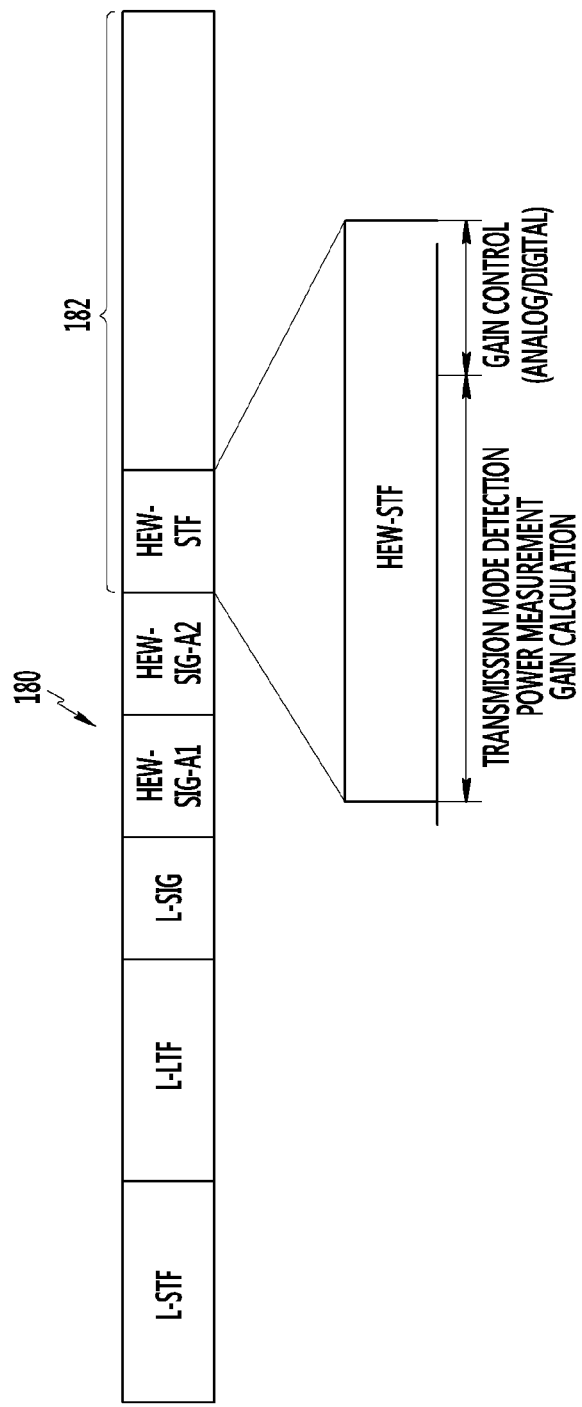
FIG. 18 and FIG. 20 are drawings for explaining an automatic gain control based on a frame format shown in FIG. 17.
Figure 19:
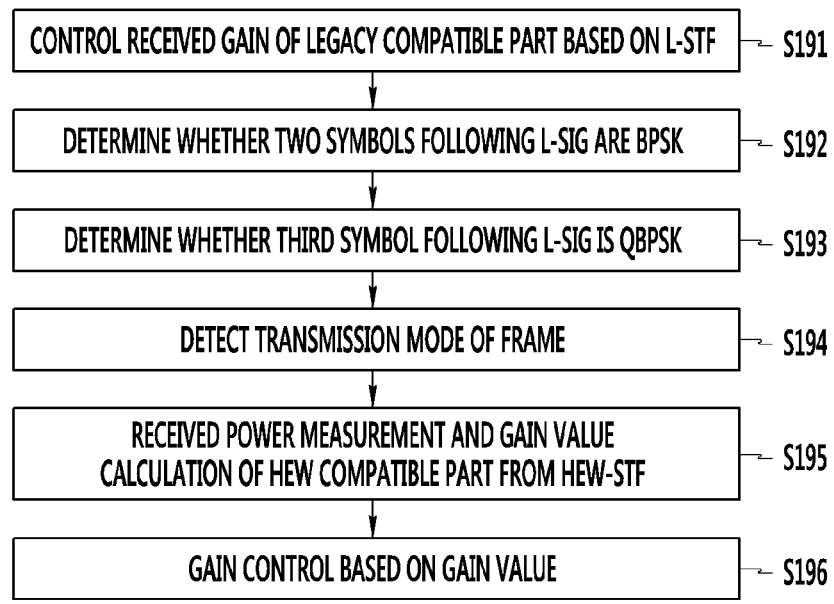
FIG. 19 is a flowchart of an automatic gain control method in a wireless communication network according to an embodiment of the present invention.
Figure 20:
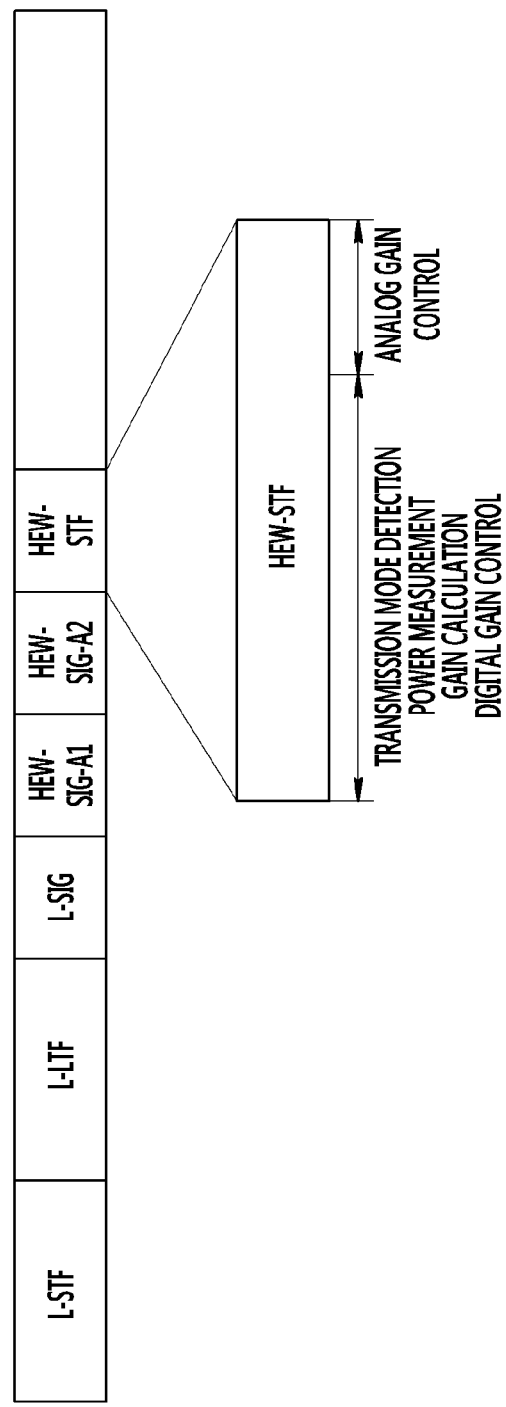
Figure 21:
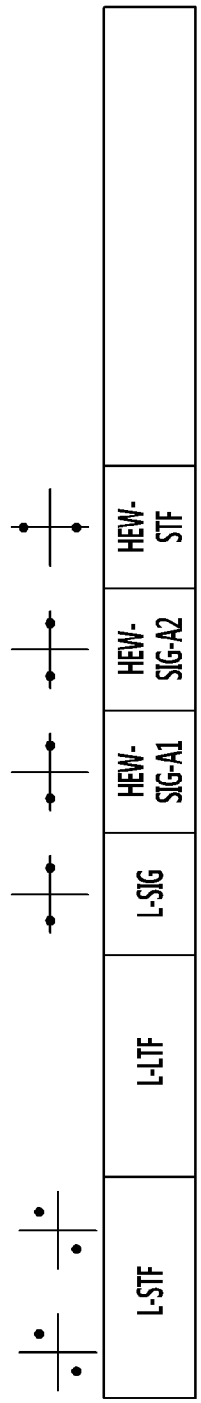
FIG. 21 is a drawing for explaining scaling of a measured power in an automatic gain control based on a frame format shown in FIG. 17.

FIG. 18 and FIG. 20 are drawings for explaining an automatic gain control based on a frame format shown in FIG. 17, FIG. 19 is a flowchart of an automatic gain control method in a wireless communication network according to an embodiment of the present invention, and FIG. 21 is a drawing for explaining scaling of a measured power in an automatic gain control based on a frame format shown in FIG. 17.

Referring to FIG. 18 and FIG. 19, upon transmitting a frame 180, a HEW device transmits a legacy compatible part 181 in an omnidirectional mode and transmits a HEW compatible part 182 using beamforming.

A HEW device receiving the frame 180 controls a received gain of the legacy compatible part 181 based on a legacy short training field (L-STF) of the legacy compatible part 181 (S191). Next, the HEW device determines whether two symbols following a legacy signal field (L-SIG) in the legacy compatible part 181 has been modulated using the BPSK modulation (S192). When the two symbols have been modulated using the BPSK modulation, the HEW device determines whether the third symbol (HEW-STF) has been modulated using the BPSK modulation or the QBPSK modulation (S193).

When the third symbol (HEW-STF) has been modulated using the QBPSK modulation, the HEW device detects a transmission mode (i.e., HEW mode) of the frame 180 (S194). Further, the HEW device measures a received power of the HEW compatible part 182 from the third symbol (HEW-STF) and calculates a gain value from the measured received power (S195). The HEW device performs an analog and digital gain control based on the gain value (S196). Since the HEW device can simultaneously perform detection of the transmission mode and measurement of the received power during a predetermined beginning interval of the HEW-STF, the HEW device can quickly perform the gain control with detecting the transmission mode.

On the other hand, an analog amplifier needs a long gain settling time for the gain control. However, the gain settling time is short in a digital amplifier because the gain can be reflected within some clocks. As shown in FIG. 20, in some embodiments, the HEW device may perform a digital gain control while detecting the transmission mode, measuring the received power, and calculating the gain value in a predetermined beginning interval of the HEW-STF.

In one embodiment, the HEW device may scale the measured power of the HEW-STF when performing the gain control based on the measured power of the HEW-STF. That is, the HEW device may scale the measured power P(HEW-STF) of the HEW-STF as Equation 1.

$$P(\text{HEW-STF})*\alpha \qquad \text{Equation 1}$$

Here, $\alpha$ is a scaling factor and is determined by a ratio P(L-STF)/P(HEW-STF) of a measured power P(L-STF) of the L-STF to a measure power P(HEW-STF)] of the HEW-STF.

In another embodiment, the HEW device may transmit a frame after applying the scaling factor to a transmission power of the HEW compatible part 182. In yet another embodiment, the HEW device may transmit a frame without applying the scaling factor, and the HEW device receiving the frame may apply the scaling factor to a received power of the HEW compatible part 182 after detecting the transmission mode.

In some embodiments, when the HEW-STF is modulated using the QBPSK modulation, the HEW-STF uses a sequence that is phase-rotated by 90° relative to a BPSK sequence. However, the L-STF uses a sequence that is phase-rotated by 45° relative to the BPSK sequence as shown in FIG. 21. That is, the HEW-STF uses the sequence having only imaginary values, but the L-STF uses the sequence having 1+j or −1−j. As such, even if the sequence of the HEW-STF is different from the sequence of the L-STF, an error that may occur by the sequence difference at the time of gain control can be calibrated by scaling the measured power of the HEW-STF with the scaling factor.

On the other hand, when a wireless communication network includes only wireless communication network devices according to an embodiment of the present invention, for example HEW devices, a frame may be generated by only fields necessary for the HEW device without using a legacy signal part for backward compatibility. Such frame format may be called HEW greenfield format. Alternatively, the HEW device may operate at an ISM (industrial scientific medical) band that is newly allocated, not an ISM band used by the previous version WLAN. In this case, the HEW device may use the HEW greenfield format.

Hereinafter, embodiments using the HEW greenfield format are described with reference to FIG. 22 to FIG. 30.

FIG. 22, FIG. 23, FIG. 24, and FIG. 25 schematically show examples of a greenfield format frame in a wireless communication network according to various embodiments of the present invention.

Figure 22:
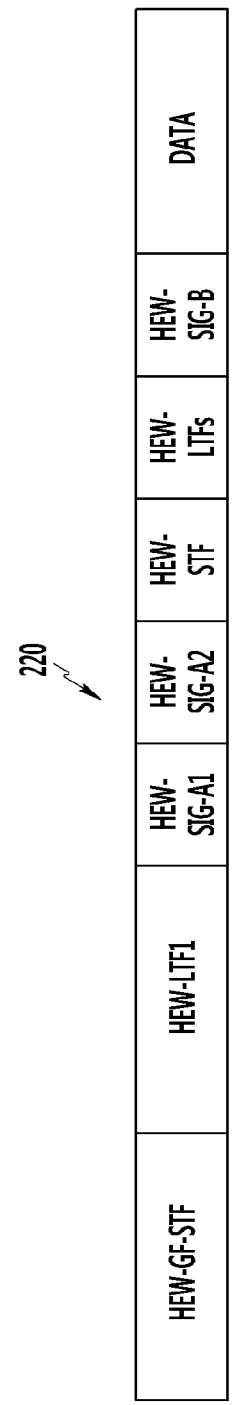
FIG. 22, FIG. 23, FIG. 24, and FIG. 25 schematically show examples of a greenfield format frame in a wireless communication network according to various embodiments of the present invention.

Referring to FIG. 22, a HEW greenfield format frame 220 includes a HEW greenfield short training field (HEW-GF-STF), a first HEW long training field (HEW-LTF1), a HEW signal field (HEW-SIG-A1 and HEW-SIG-A2), a HEW short training field (HEW-STF), an additional HEW long training field (HEW-LTFs), an additional HEW signal field (HEW-SIG-B), and a data field.

The HEW-GF-STF may be used for synchronization acquisition, and the HEW-LTF1 may be used for demodulation of the data field. The HEW signal field includes at least one symbol. It is assumed in FIG. 22 that the HEW signal field includes two symbols (HEW-SIG-A1 and HEW-SIG-A2). The HEW-SIG-A1 and HEW-SIG-A2 may include signaling information necessary for interpreting the frame 220. The HEW-STF may be used for an automatic gain control at the time of beamforming. The HEW-LTFs may be used for estimating an MIMO channel when the MIMO is supported, and may include a plurality of symbols. When a single input single output (SISO) is used, the HEW-LTFs may be omitted. The HEW-SIG-B may include signaling information for an MU-MIMO.

Figure 23:
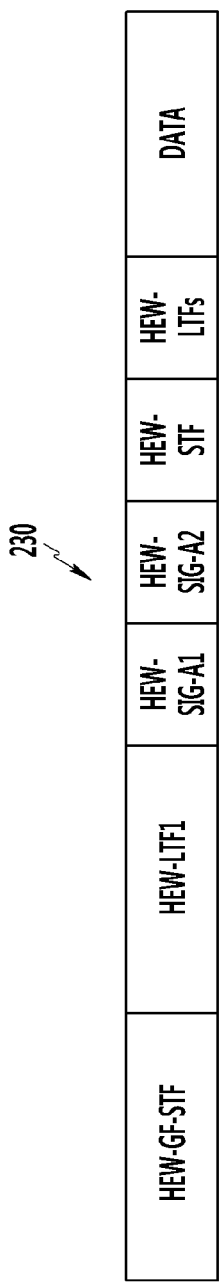

In one embodiment, when the MU-MIMO is not used, a HEW greenfield format frame 230 may not include a HEW-SIG-B as shown in FIG. 23.

Figure 24:
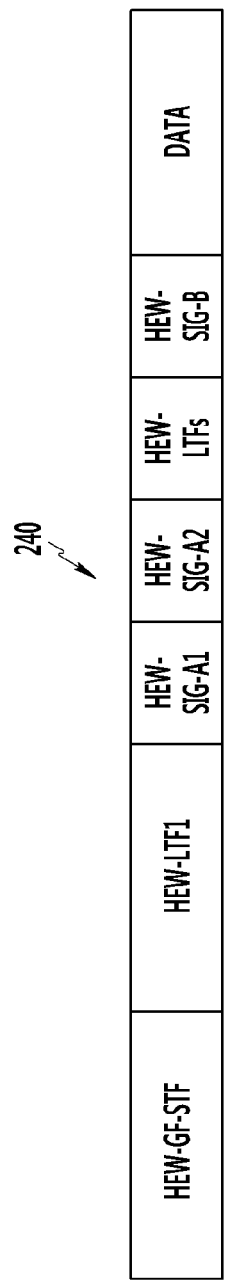

In another embodiment, when the beamforming is not used, a greenfield format frame 240 may not include a HEW-STF as shown in FIG. 24.

Figure 25:
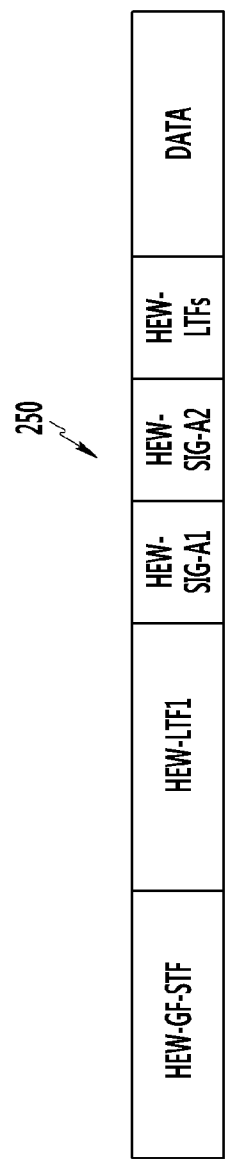

In yet another embodiment, when the MU-MIMO and the beamforming are not used, a HEW greenfield format frame 250 may not include a HEW-STF and a HEW-SIG-B as shown in FIG. 25.

Next, embodiments for transmission mode detection in a HEW greenfield format frame are described with reference to FIG. 26 to FIG. 31.

FIG. 26, FIG. 27, FIG. 28, FIG. 29, FIG. 30, and FIG. 31 schematically show examples of a greenfield format frame in a wireless communication network according to various embodiments of the present invention. In FIG. 26 to FIG. 30, a frame format shown in FIG. 22 is exemplified for convenience.

Figure 26:
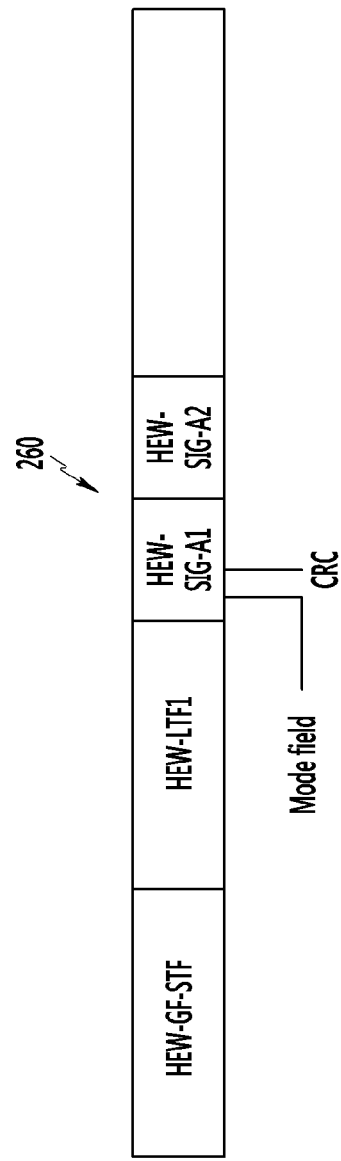
FIG. 26, FIG. 27, FIG. 28, FIG. 29, FIG. 30, and FIG. 31 schematically show examples of a greenfield format frame in a wireless communication network according to various embodiments of the present invention.

Referring to FIG. 26, one symbol of a HEW signal field, for example the first symbol (HEW-SIG-A1) includes a mode field, and the mode field includes mode information indicating a transmission mode of a frame 260. The HEW-SIG-A1 includes a CRC for protecting a part or the whole of fields of the HEW-SIG-A1. The part of the fields includes the mode field. When the CRC protects of the part including the mode field of the HEW-SIG-A1, the CRC may follow the mode field.

Alternatively, the CRC may be included in the second symbol (HEW-SIG-A2) to protect the HEW signal field (HEW-SIG-A1 and HEW-SIG-A2).

Accordingly, the HEW device can detect the mode information from the HEW-SIG-A1 and determine the transmission mode of the frame if the CRC check passes. Since the CRC protects the mode field of the HEW signal field, a reliability of the mode information can be guaranteed.

The HEW-SIG-A2 may further include a signal tail at an end of the symbol. Bits of the signal tail may be set to '0'.

Figure 27:
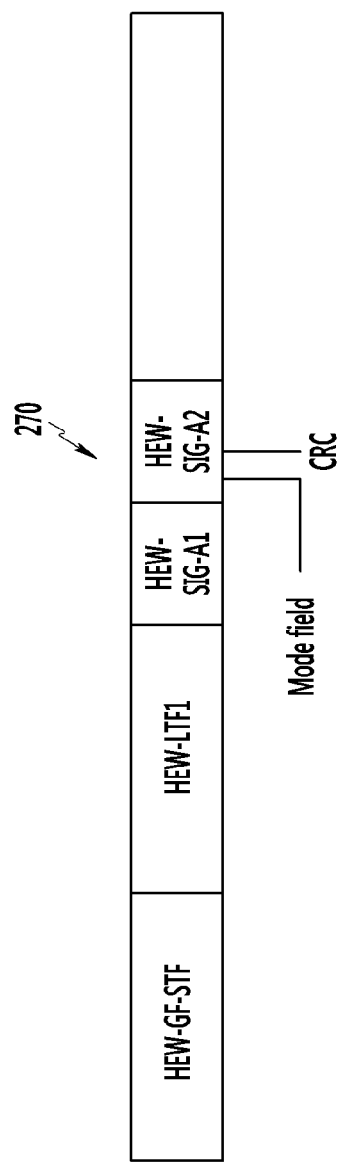
Figure 28:
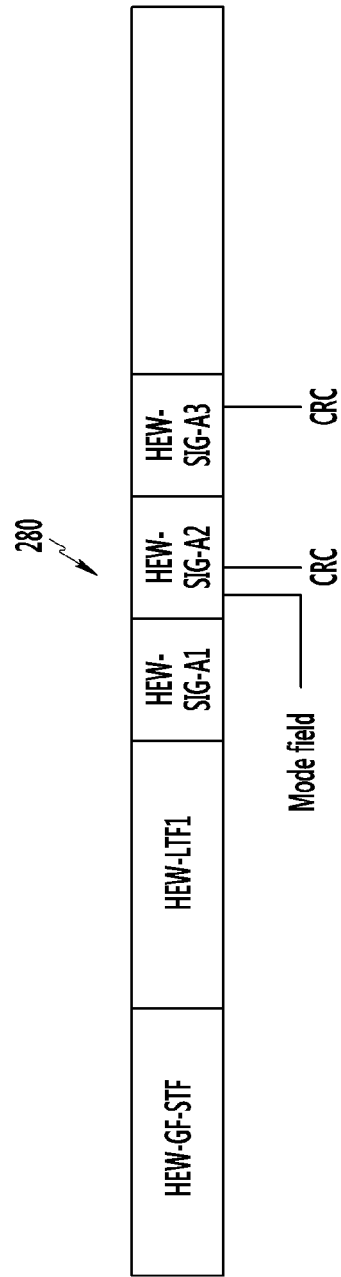

A position of the first symbol (HEW-SIG-A1) of the HEW signal field in the HEW greenfield format frame corresponds to a position of a legacy signal field (L-SIG) in other mode frames. Accordingly, in another embodiment, the second symbol (HEW-SIG-A2) of a HEW signal field may include a mode field including mode information indicating a transmission mode of a frame 270 as shown in FIG. 27. The HEW-SIG-A2 may further include a CRC for protecting the mode field. The CRC may follow the mode field to protect a part of fields of the HEW-SIG-A2, or protect entire fields of the HEW-SIG-A2. Alternatively, the CRC may further protect the HEW-SIG-A1 when protecting the part or the whole of the HEW-SIG-A2.

In yet another embodiment, the HEW signal field may include three or more symbols for carrying more signaling information. As a frame 280 shown in FIG. 28, a HEW signal field may include three symbols (HEW-SIG-A1, HEW-SIG-A2, and HEW-SIG-A3). The third symbol (HEW-SIG-A3) may include a CRC calculated over fields of the HEW-SIG-A3.

In some embodiments, a HEW greenfield format frame may use a phase difference between modulation schemes instead of a mode field.

Figure 29:
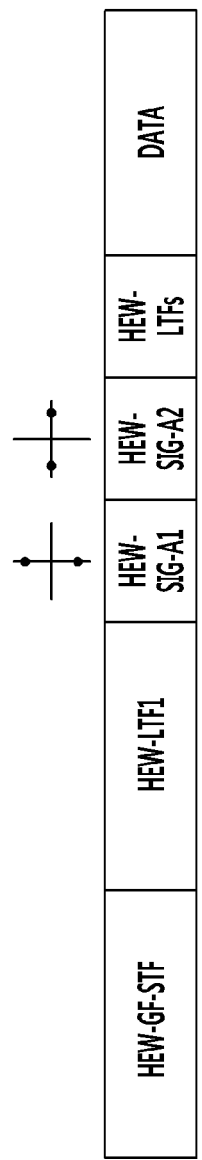

Referring to FIG. 29, in a HEW signal field, the first symbol (HEW-SIG-A1) is modulated using the QBPSK modulation and the second symbol (HEW-SIG-A2) is modulated using the BPSK modulation.

A position of the HEW-SIG-A1 in the HEW signal field corresponds to a position of a legacy signal field (L-SIG) in a legacy compatible part or a position of the first symbol (HT-SIG-A1) in an HT signal field of an HT greenfield format frame. Since the L-SIG is modulated using the BSPK modulation, a HEW device can determine that a frame is a HEW greenfield format or the HT greenfield format from the first symbol (HEW-SIG-A1) of the HEW signal field. Since the second symbol (HT-SIG-A2) of the HT signal field in the HT greenfield format frame is modulated using the QBPSK modulation, the HEW device can determine that the frame is the HEW greenfield format from the second symbol (HEW-SIG-A2) of the HEW signal field.

Figure 30:
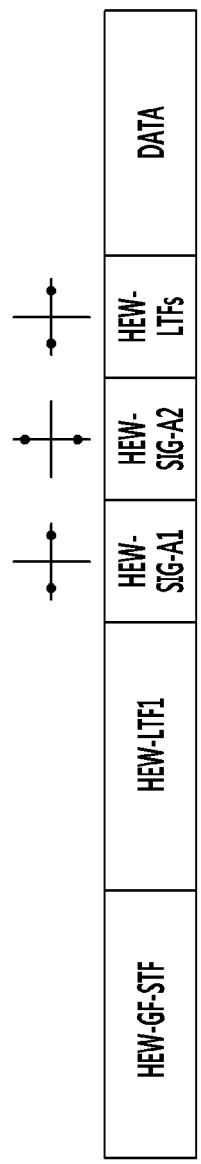

Referring to FIG. 30, in a HEW signal field, the first symbol (HEW-SIG-A1) is modulated using the BPSK modulation, the second symbol (HEW-SIG-A2) is modulated using the QBPSK modulation, and a symbol following (i.e., directly following) the second symbol (HEW-SIG-A2) is modulated using the BPSK modulation. The symbol following the HEW-SIG-A2 may be the first symbol (HEW-LTF) of an additional HEW long training field, a HEW short training field (HEW-STF), or the third symbol (HEW-SIG-A3) of the HEW signal field.

A position of the HEW-SIG-A1 in the HEW signal field corresponds to a position of a legacy signal field (L-SIG) in a legacy compatible part, and a position of the HEW-SIG-A2 in the HEW signal field corresponds to a position of the first symbol (HT-SIG-A1) in an HT signal field of an HT-mixed format frame.

Since the HEW-SIG-A1 and the HEW-SIG-A2 are modulated using the BPSK modulation and the QBPSK modulation, respectively, a HEW device can determine that a frame is a HEW greenfield format or the HT-mixed format from the first and second symbols (HEW-SIG-A1 and HEW-SIG-A2) of the HEW signal field. Since the second symbol (HT-SIG-A2) of the HT signal field in the HT-mixed format frame is modulated using the QBPSK modulation, the HEW device can determine that the frame is the HEW greenfield format from the symbol following the second symbol (HEW-SIG-A2) of the HEW signal field.

In some embodiments, an LTF sequence of a first HEW long training field (HEW-LTF1) in a HEW greenfield format frame may be designed to have orthogonality with a sequence of a legacy mode frame, an HT mode frame, or a VHT mode frame.

Figure 31:
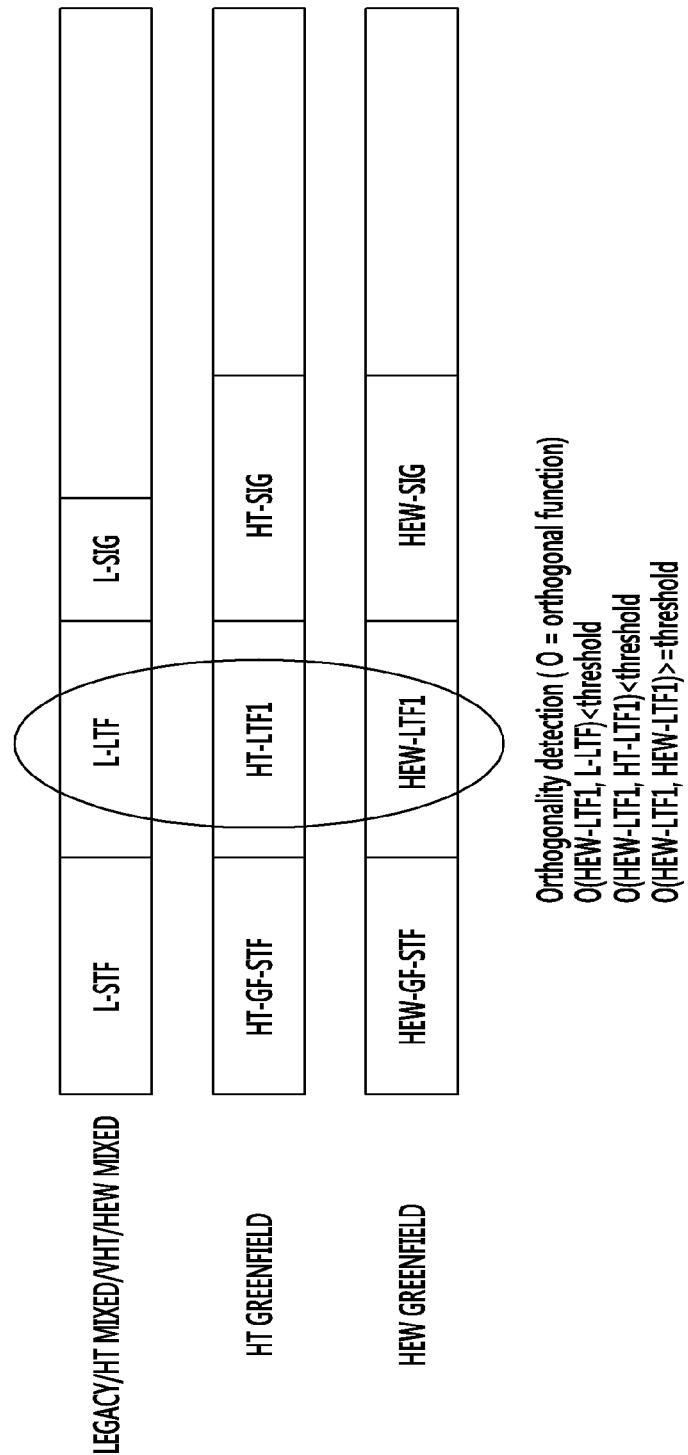

If the HEW-LTF1 is transmitted with maintaining the orthogonality with the L-LTF or the HT-LTF1 of the HT greenfield format by an orthogonality function operation, a receiver determines that the received frame is the HEW greenfield format when a value extracted by the orthogonality function operation is greater than or equal to a threshold value. As shown in FIG. 31, a result by the orthogonality function operation between the HEW-LTF1 and a previous long training field (L-LTF or HT-LTF1) is ideally zero but may be increased as the noise is increased. A result by the orthogonality function operation between two HEW-LTF1s is ideally similar to the number of subcarriers but may be decreased as the noise is increased. Therefore, the HEW device can determine that the received frame is the HEW greenfield format when the result by the orthogonality function operation between the LTF sequence of the received frame and the HEW-LTF1 sequence that is stored in advance is greater than or equal to the threshold value. The HEW device can determine that the received frame is not the HEW greenfield format when the result is less than the threshold value.

The orthogonality function O(A,B) between two sequences A and B having the same length may be defined as Equation 2.

$$\Sigma_k A(k)B(k)A(k+m)^*B(k+m)^* \quad \text{Equation 2}$$

Here, k denotes a subcarrier index in subcarriers except a DC (direct current) subcarrier and m is an integer greater than zero. For example, when m is one, the orthogonality function expressed in Equation 3 may be used. Equation 3 corresponds to an equation for checking a sum of results by a product operation between adjacent subcarrier indices on the two sequences A and B. When the resulting value of Equation 2 or 3 is zero, the HEW device can detect the transmission mode by determining that the orthogonality is maintained.

$$\Sigma_k A(k)B(k)A(k+1)^*B(k+1)^* \quad \text{Equation 3}$$

Alternatively, an orthogonality function such as Equation 4 may be used.

$$\Sigma_{ij} A(i)B(i)A(j)^*B(j)^* \quad \text{Equation 4}$$

Here, i and j denote a subcarrier index in subcarriers except a DC subcarrier where i is a subcarrier index in subcarriers whose indices are less than an index of a center subcarrier and j is a subcarrier index in subcarriers whose indices are greater than the index of the center subcarrier. For example, i may be a subcarrier index increasing from a minimum subcarrier index to the center subcarrier index in the subcarriers except the DC subcarrier, and j may be a subcarrier index decreasing from a maximum subcarrier index to the center subcarrier index in the subcarriers except the DC subcarrier. Equation 4 corresponds to an equation for checking a sum of results by a product operation between subcarrier indices that are symmetric about the center subcarrier index on the two sequences A and B. When the resulting value of Equation 4 is zero, the HEW device can detect the transmission mode by determining that the orthogonality is maintained.

While the HEW greenfield format has been exemplified in FIG. 31, a sequence of the L-LTF in the HEW-mixed format may be designed to have orthogonality with a sequence of the legacy mode frame, the HT mode frame, or the VHT mode frame.

In some embodiment, when only HEW devices exist in a network, two symbols of the HEW signal field may be modulated using the same modulation, i.e., the BPSK modulation or the QBPSK modulation.

Figure 32:
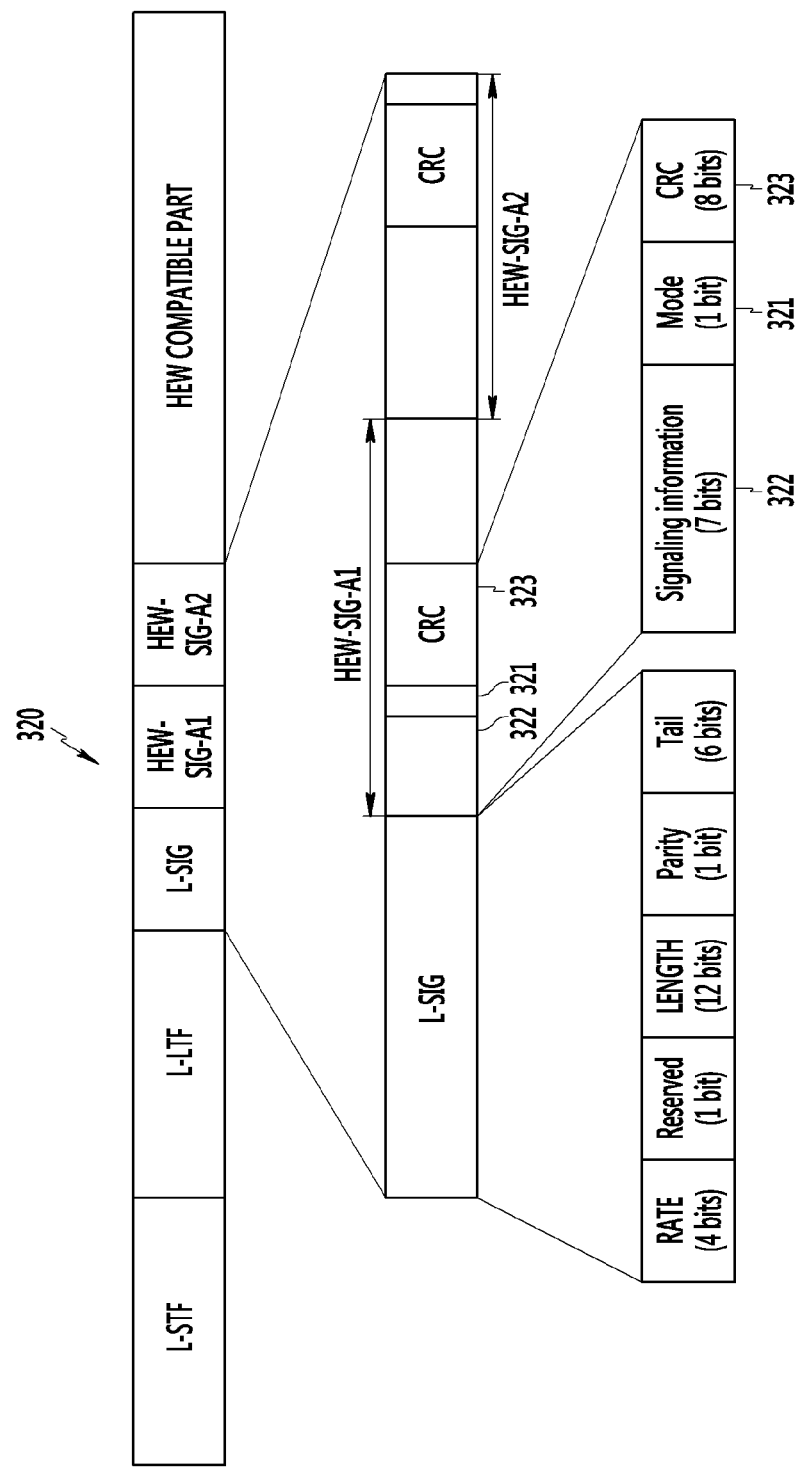
FIG. 32 schematically shows an example of a frame format for transmission mode detection in a wireless communication network according to yet another embodiment of the present invention.
Figure 33:
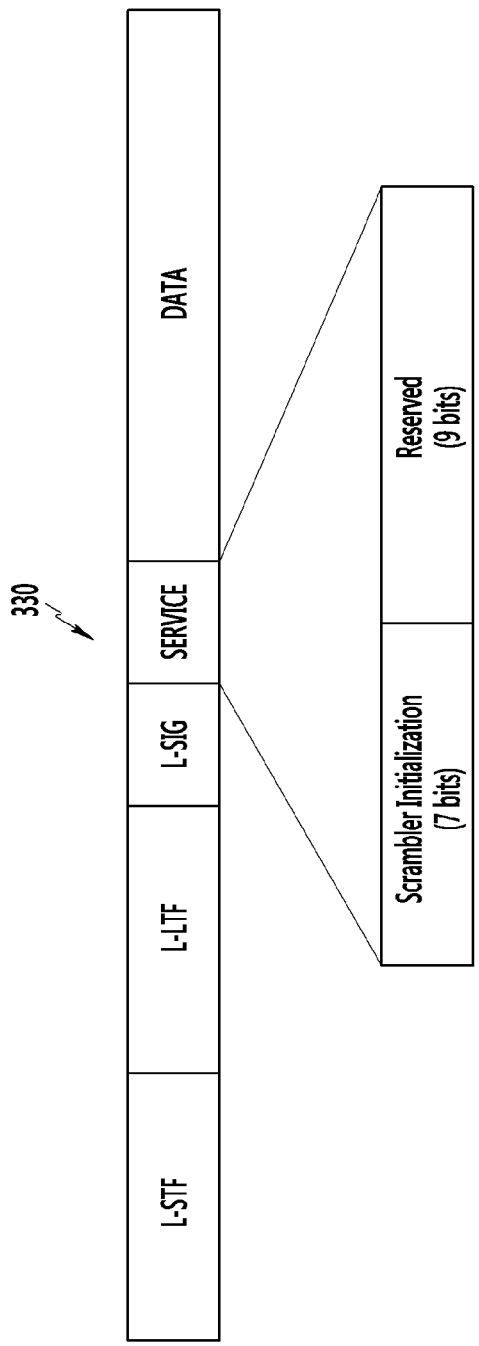
FIG. 33 shows a service field of a legacy mode frame.

FIG. 32 schematically shows an example of a frame format for transmission mode detection in a wireless communication network according to yet another embodiment of the present invention, and FIG. 33 shows a service field of a legacy mode frame.

Referring to FIG. 32, when a HEW mode frame 320 is transmitted with modulating a legacy signal field (L-SIG) and a HEW signal field (HEW-SIG-A1 and HEW-SIG-A2) using the BPSK modulation, a legacy device, an HT device, or a VHT device may determine that the frame 320 is a legacy mode frame as described with reference to FIG. 10 to FIG. 14. However, a HEW device receiving the frame 320 determines whether the frame 320 is the legacy mode frame or the HEW mode frame. Since a rate field of the L-SIG is set to 6 Mbps in the HEW mode frame, the HEW device can use for determination only the legacy mode frame having a data field modulated using the BPSK modulation.

As shown in FIG. 33, the first symbol of the data field of the legacy mode frame 330 includes a service field. The service field has 16 bits including 7 bits for a scrambler initialization and 9 reserved bits. Therefore, 9 bits whose positions correspond to positions of these 9 reserved bits may be used a mode field carrying mode information and a CRC in the HEW mode frame 320. Since the first symbol (HEW-SIG-A1) of the HEW signal field corresponds to the service field of the legacy mode frame 330, the eighth bit (i.e., a bit corresponding to the first bit of the reserved bits) of the HEW-SIG-A1 may be used as a mode field 321 and 8 bits following the eighth bit may be used as a CRC 323 for protecting the mode field 321. In one embodiment, the first 7 bits of the HEW-SIG-A1 may carry signaling information. In another embodiment, the CRC 323 may be calculated for protecting the L-SIG and the first 8 bits of the HEW-SIG-A1. Accordingly, error detection reliability of the L-SIG can be enhanced compared with a conventional scheme for detecting an error of the L-SIG by 1 bit parity check. In yet another embodiment, the CRC 323 may be calculated for protecting only the first 8 bits of the HEW-SIG-A1. In still another embodiment, the CRC 323 may be calculated for protecting the L-SIG and entire fields of the HEW-SIG-A1 or for protecting the entire fields of the HEW-SIG-A1.

In some embodiments, a part of bits corresponding to scrambler initialization bits of the legacy mode frame may be used as the mode field 321 and the CRC 323 may be included to bits corresponding to the reserved bits of the service field.

In one embodiment, bits being less than 8 bits may be used as the CRC 323. In this case, the mode field 321 corresponding to the reserved bits of the service field may have two or more bits.

When the mode field 321 and the CRC 323 are assigned to a certain field of the HEW mode frame 320, false positive detection may occur by a random value set to a corresponding field of the legacy mode frame. Accordingly, the CRC 323 is assigned to bits corresponding to the reserved bits and the mode field 321 is assigned to a part of bits corresponding to the reserved bits or scrambler initialization bits in service field of the legacy mode frame such that the false positive detection can be prevented.

Next, a WLAN device according to an embodiment of the present invention is applied is described with reference to FIG. 34 to FIG. 36.

Figure 34:
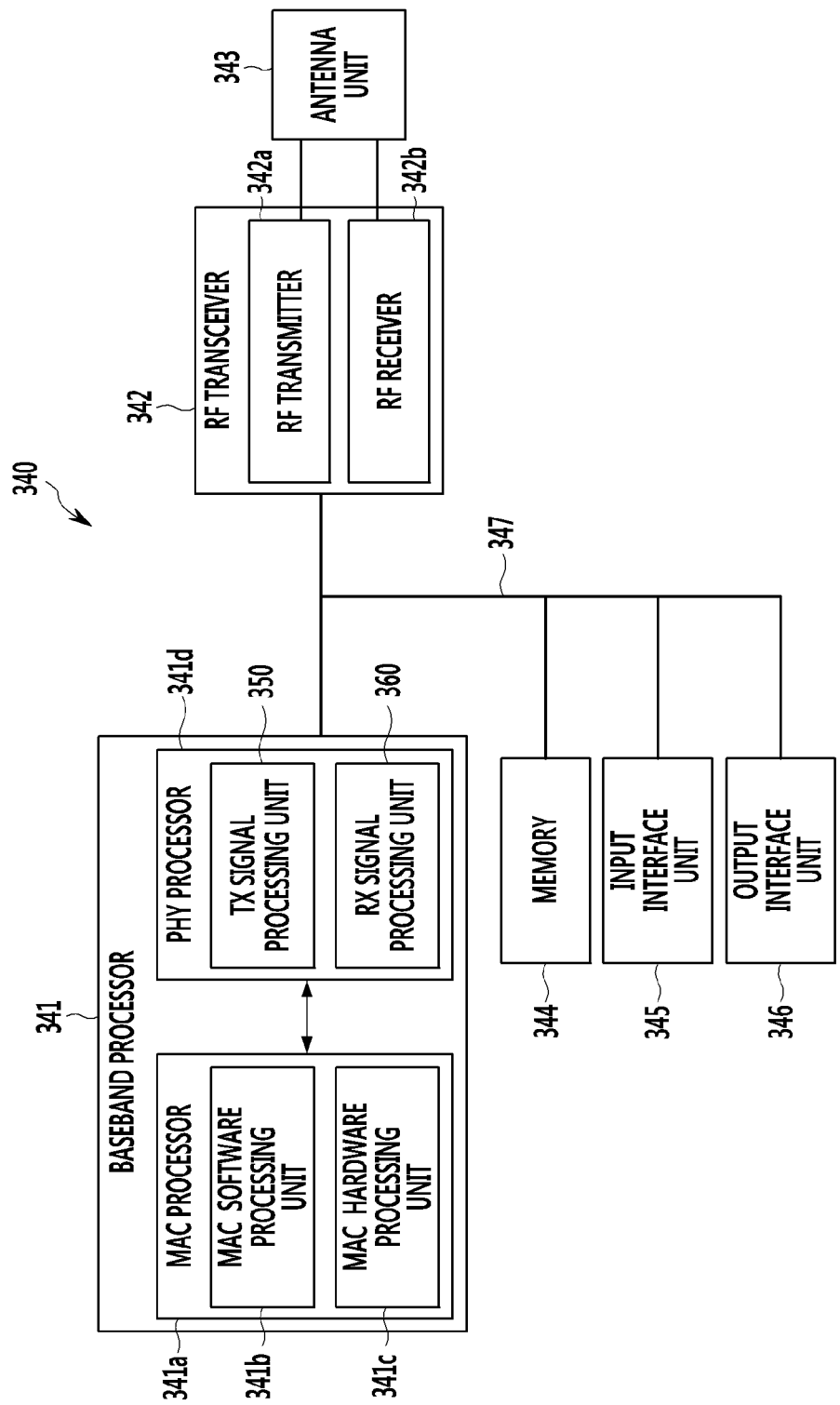
FIG. 34 is a schematic block diagram exemplifying a WLAN device according to an embodiment of the present invention.

FIG. 34 is a schematic block diagram exemplifying a WLAN device according to an embodiment of the present invention.

Referring to FIG. 34, the WLAN device, for example a HEW device 340, includes a baseband processor 341, a radio frequency (RF) transceiver 342, an antenna unit 343, a memory 344, an input interface unit 345, an output interface unit 346, and a bus 347.

The baseband processor 341 performs baseband signal processing described above, and includes a MAC processor 341*a* and a PHY processor 341*d*.

In one embodiment, the MAC processor 341*a* may include a MAC software processing unit 341*b* and a MAC hardware processing unit 341*c*. The memory 344 may store software (hereinafter referred to as "MAC software") including at least some functions of the MAC layer. The MAC software processing unit 341*b* executes the MAC software to implement the some functions of the MAC layer, and the MAC hardware processing unit 341*c* may implement remaining functions of the MAC layer as hardware (hereinafter referred to "MAC hardware"). However, the MAC processor 341*a* is not limited to this.

The PHY processor 341*d* includes a transmitting signal processing unit 345 and a receiving signal processing unit 346.

The baseband processor 341, the memory 344, the input interface unit 345, and the output interface unit 346 may communicate with each other via the bus 347.

The RF transceiver 342 includes an RF transmitter 342*a* and an RF receiver 342*b*.

The memory 344 may further store an operating system and applications. The input interface unit 345 receives information from a user, and the output interface unit 346 outputs information to the user.

The antenna unit 343 includes one or more antennas. When MIMO or MU-MIMO is used, the antenna unit 343 may include a plurality of antennas.

A frame transmitting method or a transmission mode detecting method according to above embodiments may be implemented by the MAC processor 341*a* and/or the PHY processor 341*d*.

Figure 35:
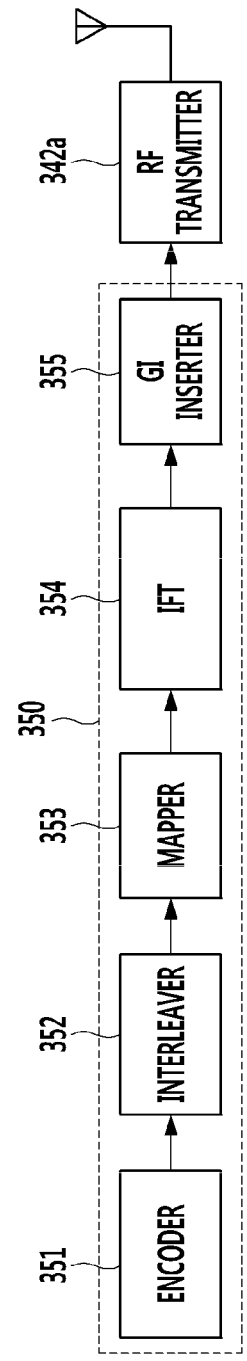
FIG. 35 is a schematic block diagram exemplifying a transmitting signal processor of a WLAN device according to an embodiment of the present invention.

FIG. 35 is a schematic block diagram exemplifying a transmitting signal processor of a WLAN device according to an embodiment of the present invention.

Referring to FIG. 35, a transmitting signal processing unit 3345 includes an encoder 351, an interleaver 352, a mapper 353, an inverse Fourier transformer (IFT) 354, and a guard interval (GI) inserter 355.

The encoder 351 encodes input data. For example, the encoder 3345 may be a forward error correction (FEC) encoder. The FEC encoder may include a binary convolutional code (BCC) encoder followed by a puncturing device, or may include a low-density parity-check (LDPC) encoder.

The transmitting signal processing unit 3345 may further include a scrambler for scrambling the input data before the encoding to reduce the probability of long sequences of 0s or 1s. If BCC encoding is used in the encoder, the transmitting signal processing unit 3345 may further include an encoder parser for demultiplexing the scrambled bits among a plurality of BCC encoders. If LDPC encoding is used in the encoder, the transmitting signal processing unit 3345 may not use the encoder parser.

The interleaver 352 interleaves the bits of each stream output from the encoder to change order of bits. Interleaving may be applied only when BCC encoding is used. The mapper 353 maps the sequence of bits output from the interleaver to constellation points. If the LDPC encoding is used in the encoder, the mapper 353 may further perform LDPC tone mapping besides the constellation mapping.

When the MIMO or the MU-MIMO is used, the transmitting signal processing unit 3345 may use a plurality of interleavers 352 and a plurality of mappers corresponding to the number of $N_{SS}$ of spatial streams. In this case, the transmitting signal processing unit 3345 may further include a stream parser for dividing outputs of the BCC encoders or the LDPC encoder into blocks that are sent to different interleavers 352 or mappers 353. The transmitting signal processing unit 3345 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 354 converts a block of the constellation points output from the mapper 353 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 354 may be provided for each transmit chain.

When the MIMO or the MU-MIMO is used, the transmitting signal processing unit 3345 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

In some embodiments, an FFT size applied to a symbol of a legacy compatible part may be 64 for backward compatibility in frame formats described above. Subcarrier spacing of the symbol in the legacy compatible part may be 312.5 kHz.

An FFT size applied to a symbol of a HEW compatible part may be 256. Subcarrier spacing of the symbol in the HEW compatible part may be 312.5 kHz.

The GI inserter 355 prepends a GI to the symbol. The transmitting signal processing unit 3345 may optionally perform windowing to smooth edges of each symbol after inserting the GI. The RF transmitter 342*a* converts the symbols into an RF signal and transmits the RF signal via the antenna unit 343. When the MIMO or the MU-MIMO is used, the GI inserter 355 and the RF transmitter 342*a* may be provided for each transmit chain.

In some embodiments, a GI inserted to a symbol of a HEW compatible part may be selected from among 0.8, 1.6, and 3.2 µs. In one embodiment, the GI of 0.8 µs may be inserted to the symbol of the HEW compatible part in an indoor environment. The GI of 1.6 is may be inserted to the symbol of the HEW compatible part in an outdoor environment, an indoor uplink MU-MIMO, or an indoor uplink OFDMA. The GI of 3.2 µs may be inserted to the symbol of the HEW compatible part in an outdoor uplink MU-MIMO or an outdoor uplink OFDMA. Information indicating which GI is inserted to the symbol of the HEW compatible part may be included to at least one of a L-SIG, a HEW-SIG, a HEW-SIG-A, or a HEW-SIG-B.

Figure 36:
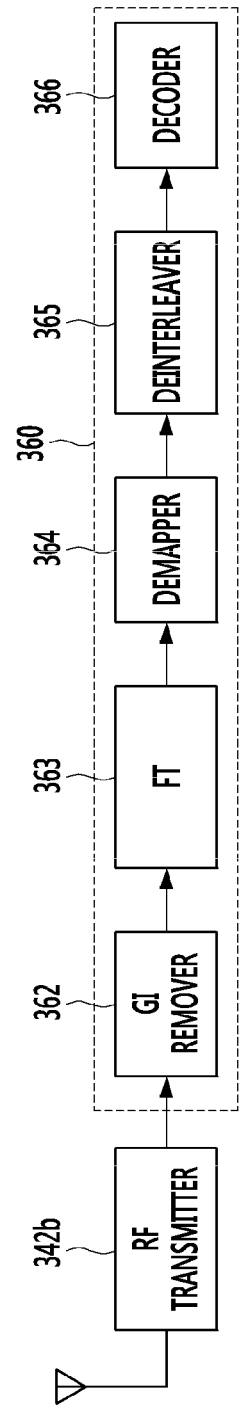
FIG. 36 is a schematic block diagram exemplifying a receiving signal processing unit in a WLAN device according to an embodiment of the present invention.

FIG. 36 is a schematic block diagram exemplifying a receiving signal processing unit in a WLAN device according to an embodiment of the present invention.

Referring to FIG. 36, a receiving signal processing unit 3346 includes a GI remover 362, a Fourier transformer (FT) 363, a demapper 364, a deinterleaver 365, and a decoder 366.

An RF receiver 342b receives an RF signal via the antenna unit 343 and converts the RF signal into the symbols. The GI remover 362 removes the GI from the symbol. When the MIMO or the MU-MIMO is used, the RF receiver 342b and the GI remover 362 may be provided for each receive chain.

The FT 363 converts the symbol (i.e., the time domain block) into a block of the constellation points by using a discrete Fourier transform (DFT) or a fast Fourier transform (FFT). The Fourier transformer 363 may be provided for each receive chain.

When the MIMO or the MU-MIMO is used, the receiving signal processing unit 3346 may a spatial demapper for converting the Fourier transformed receiver chains to constellation points of the space-time streams, and an STBC decoder for despreading the constellation points from the space-time streams into the spatial streams.

The demapper 364 demaps the constellation points output from the Fourier transformer 363 or the STBC decoder to the bit streams. If the LDPC encoding is used, the demapper 364 may further perform LDPC tone demapping before the constellation demapping. The deinterleaver 365 deinterleaves the bits of each stream output from the demapper 364. Deinterleaving may be applied only when BCC encoding is used.

When the MIMO or the MU-MIMO is used, the receiving signal processing unit 3346 may use a plurality of demappers 364 and a plurality of deinterleavers 365 corresponding to the number of spatial streams. In this case, the receiving signal processing unit 3346 may further include a stream deparser for combining the streams output from the deinterleavers 365.

The decoder 366 decodes the streams output from the deinterleaver 365 or the stream deparser. For example, the decoder 3345 may be an FEC decoder. The FEC decoder may include a BCC decoder or an LDPC decoder. The receiving signal processing unit 3346 may further include a descrambler for descrambling the decoded data. If BCC decoding is used in the decoder, the receiving signal processing unit 3346 may further include an encoder deparser for multiplexing the data decoded by a plurality of BCC decoders. If LDPC decoding is used in the decoder, the receiving signal processing unit 3345 may not use the encoder deparser.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting a frame by a device in a wireless local area network (WLAN), the method comprising:
    generating a legacy short training field;
    generating a legacy long training field immediately following the legacy short training field;
    generating a legacy signal field immediately following the legacy long training field;
    generating a BPSK-modulated signal field including one orthogonal frequency division multiplexing (OFDM) symbol immediately following the legacy signal field, wherein the one OFDM symbol of the BPSK-modulated signal field includes a plurality of information bits, a first part of the plurality of information bits corresponds to a mode field indicating whether a mode of a frame is a High Efficiency (HE) mode of the WLAN, and a second part of the plurality of information bits corresponds to tail bits; and
    transmitting the frame including the legacy signal field, the legacy short training field, the legacy long training field, and the BPSK-modulated signal field.

2. The method of claim 1, wherein the one OFDM symbol of the BPSK-modulated signal field further includes a check bit for protecting the legacy signal field and the mode field.

3. The method of claim 2, wherein the one OFDM symbol of the BPSK-modulated signal field further includes an additional field for carrying signaling information, and
    wherein the check bit protects the legacy signal field, the mode field, and the additional field.

4. The method of claim 1, wherein the mode field is positioned at a beginning of the OFDM one symbol of the BPSK-modulated signal field.

5. The method of claim 1, wherein the one OFDM symbol of the BPSK-modulated signal field further includes a first check bit protecting the BPSK-modulated signal field, and
    wherein the frame further includes two OFDM symbols immediately following the BPSK-modulated signal field, and the second OFDM symbol of the two OFDM symbols includes a second check bit protecting the two OFDM symbols.

6. The method of claim 5, wherein the first check bit includes a parity bit.

7. The method of claim 6, wherein the second check bit includes a cyclic redundancy check (CRC).

8. A method of detecting a mode by a device in a wireless local area network (WLAN), the method comprising:
    receiving a frame including a legacy short training field, a legacy long training field immediately following the legacy short training field, and a legacy signal field immediately following the legacy long training field, a BPSK-modulated signal field including one orthogonal frequency division multiplexing (OFDM) symbol immediately following the legacy long training field, wherein the one OFDM symbol of the BPSK-modulated signal field includes a plurality of information bits, a first part of the plurality of information bits corresponds to a mode field indicating whether a mode of the frame is a High Efficiency (HE) mode of the WLAN, and a second part of the plurality of information bits corresponds to tail bits; and
    determining the mode of the frame based on the BPSK-modulated signal field.

9. The method of claim 8, wherein the one OFDM symbol of the BPSK-modulated signal field includes a check bit for protecting the legacy signal field and the mode field.

10. The method of claim 9, wherein the one OFDM symbol of the BPSK-modulated signal field further includes an additional field for carrying signaling information, and
   wherein the check bit protects the legacy signal field, the mode field, and the additional field.

11. The method of claim 8, wherein the one OFDM symbol of the BPSK-modulated signal field further includes a first check bit protecting the BPSK-modulated signal field, and
   wherein the frame further includes two OFDM symbols immediately following the BPSK-modulated signal field, and the second OFDM symbol of the two OFDM symbols includes a second check bit protecting the two OFDM symbols.

12. The method of claim 11, wherein the first check bit includes a parity bit.

13. The method of claim 12, wherein the second check bit includes a cyclic redundancy check (CRC).

14. The method of claim 8, wherein the mode field is positioned at a beginning of the one OFDM symbol of the BPSK-modulated signal field.

\* \* \* \* \*